United States Patent
Dhanoa et al.

(10) Patent No.: US 12,495,298 B2
(45) Date of Patent: *Dec. 9, 2025

(54) SELF-SOVEREIGN IDENTIFICATION VIA DIGITAL CREDENTIALS FOR IDENTITY ATTRIBUTES

(71) Applicant: Wells Fargo Bank, N.A., San Francisco, CA (US)

(72) Inventors: Harmit Singh Dhanoa, Mountain House, CA (US); Andrew G. Foote, San Francisco, CA (US); Nikolai Stroke, Gilbert, AZ (US); Duc M. Trinh, Golden Valley, MN (US)

(73) Assignee: Wells Fargo Bank, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 18/943,336

(22) Filed: Nov. 11, 2024

(65) Prior Publication Data
US 2025/0071549 A1    Feb. 27, 2025

Related U.S. Application Data

(63) Continuation of application No. 18/226,566, filed on Jul. 26, 2023, now Pat. No. 12,143,816, which is a (Continued)

(51) Int. Cl.
*H04W 12/06* (2021.01)
*G06F 3/0482* (2013.01)
(Continued)

(52) U.S. Cl.
CPC ........ *H04W 12/068* (2021.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

| 397,198 A | 2/1889 | Meisselbacii et al. |
| 4,169,040 A | 9/1979 | Bea et al. |
| (Continued) | | |

FOREIGN PATENT DOCUMENTS

| WO | WO-2017/190175 A1 | 11/2017 |
| WO | WO-2018/126077 A1 | 7/2018 |
| (Continued) | | |

OTHER PUBLICATIONS

A White Paper from the Sovrin Foundation, "Sovrin: A Protocol and Token for Self-Sovereign Identity and Decentralized Trust", Version 1.0 Jan. 2018. 42 pages.

(Continued)

*Primary Examiner* — Kristy A Haupt
(74) *Attorney, Agent, or Firm* — Foley & Lardner LLP

(57) ABSTRACT

Disclosed are example methods, systems, and devices that allow for the generation and provisioning of digital credentials, which may demonstrate that a trusted entity has validated individual identity attributes, or sets of attributes, of a user. Digital credentials may also demonstrate one or more extrapolations resulting from deductions or inductions from validated identity attributes. A receiver device may indicate which identity attributes or extrapolations are sought by displaying a QR or other code and/or via a transmission using NFC or other wireless communication, and a user device may access corresponding digital attributes in an ID wallet to be provisioned via code or transmission. Digital credentials may restrict uses and usability of identity attributes. Cryptographic keys and/or distributed ledger records may allow recipients to verify authenticity of digital credentials. The same identity attribute may be (Continued)

proven by showing validation by multiple selectable trusted entities.

20 Claims, 15 Drawing Sheets

Related U.S. Application Data continuation of application No. 17/898,108, filed on Aug. 29, 2022, now Pat. No. 11,729,616, which is a continuation of application No. 16/598,904, filed on Oct. 10, 2019, now Pat. No. 11,432,149.

(51) Int. Cl.
*G06F 3/0484* (2022.01)
*G06F 9/451* (2018.01)
*G06K 7/10* (2006.01)
*G06K 7/14* (2006.01)
*G06K 19/06* (2006.01)
*H04L 9/32* (2006.01)
*H04W 4/80* (2018.01)
*H04W 12/069* (2021.01)

(52) U.S. Cl.
CPC ......... *G06F 9/451* (2018.02); *G06K 7/10722* (2013.01); *G06K 7/1417* (2013.01); *G06K 19/06037* (2013.01); *H04L 9/321* (2013.01); *H04W 12/069* (2021.01); *H04W 4/80* (2018.02)

(56) References Cited

U.S. PATENT DOCUMENTS

| | | | |
|---|---|---|---|
| 4,531,023 A | 7/1985 | Levine | |
| 5,123,047 A | 6/1992 | Rosenow | |
| 5,613,012 A | 3/1997 | Hoffman et al. | |
| 5,764,789 A | 6/1998 | Pare, Jr. et al. | |
| 5,781,632 A | 7/1998 | Odom | |
| 5,802,199 A | 9/1998 | Pare et al. | |
| 5,805,719 A | 9/1998 | Pare et al. | |
| 5,870,723 A | 2/1999 | Pare et al. | |
| 5,892,905 A | 4/1999 | Brandt et al. | |
| 5,983,005 A | 11/1999 | Monteiro et al. | |
| 6,154,879 A | 11/2000 | Pare et al. | |
| 6,233,617 B1 | 5/2001 | Rothwein et al. | |
| 6,275,941 B1 | 8/2001 | Saito et al. | |
| 6,307,956 B1 | 10/2001 | Black | |
| 6,366,682 B1 | 4/2002 | Hoffman et al. | |
| 6,526,125 B1 | 2/2003 | Lindsay et al. | |
| 6,701,378 B1 | 3/2004 | Gilhuly et al. | |
| 6,836,554 B1 | 12/2004 | Bolle et al. | |
| 6,980,670 B1 | 12/2005 | Hoffman et al. | |
| 6,985,887 B1 | 1/2006 | Sunstein et al. | |
| 6,990,588 B1 | 1/2006 | Yasukura | |
| 7,082,415 B1 | 7/2006 | Robinson et al. | |
| 7,162,451 B2 | 1/2007 | Berger et al. | |
| 7,210,164 B1 | 4/2007 | Jandrell | |
| 7,237,717 B1 | 7/2007 | Rao et al. | |
| 7,290,288 B2 | 10/2007 | Gregg | |
| 7,349,557 B2 | 3/2008 | Tibor | |
| 7,367,049 B1 | 4/2008 | Robinson et al. | |
| 7,370,356 B1 | 5/2008 | Guo | |
| 7,427,033 B1 | 9/2008 | Roskind | |
| 7,565,545 B2 | 7/2009 | Doyle et al. | |
| 7,606,401 B2 | 10/2009 | Hoffman et al. | |
| 7,631,193 B1 | 12/2009 | Hoffman | |
| 7,769,633 B2 | 8/2010 | Jokinen et al. | |
| 7,793,334 B2 | 9/2010 | Lewis | |
| 8,200,980 B1 | 6/2012 | Robinson et al. | |
| 8,214,291 B2 | 7/2012 | Pelegero et al. | |
| 8,260,806 B2 | 9/2012 | Steele et al. | |
| 8,364,567 B2 | 1/2013 | Shnowske et al. | |
| 8,429,068 B1 | 4/2013 | Fasoli et al. | |
| 8,429,072 B1 | 4/2013 | Sheehan et al. | |
| 8,458,465 B1 | 6/2013 | Stern et al. | |
| 8,577,810 B1 | 11/2013 | Dalit et al. | |
| 8,646,060 B1 | 2/2014 | Ben Ayed | |
| 8,713,674 B1 | 4/2014 | Geide | |
| 8,781,923 B2 | 7/2014 | Pitroda et al. | |
| 8,793,305 B2 | 7/2014 | Fiatal | |
| 8,825,757 B2 | 9/2014 | Lunt et al. | |
| 8,838,988 B2 | 9/2014 | Bravo et al. | |
| 8,868,036 B1 | 10/2014 | Nasserbakht et al. | |
| 8,902,045 B1 | 12/2014 | Linn et al. | |
| 8,917,826 B2 | 12/2014 | Bravo et al. | |
| 8,918,854 B1 | 12/2014 | Giobbi | |
| 8,923,838 B1 | 12/2014 | Bush et al. | |
| 9,002,750 B1 | 4/2015 | Chu et al. | |
| 9,009,797 B1 | 4/2015 | Fox | |
| 9,032,498 B1 | 5/2015 | Ben Ayed | |
| 9,064,376 B1 | 6/2015 | Rubin | |
| 9,105,032 B2 | 8/2015 | Altberg et al. | |
| 9,111,085 B1 | 8/2015 | Darmour | |
| 9,119,539 B1 | 9/2015 | Dotan et al. | |
| 9,148,424 B1 | 9/2015 | Yang | |
| 9,195,834 B1 | 11/2015 | Jakobsson | |
| 9,210,177 B1 | 12/2015 | Hughes | |
| 9,300,645 B1 | 3/2016 | Rao et al. | |
| 9,300,661 B1 | 3/2016 | O'Malley et al. | |
| 9,330,398 B2 | 5/2016 | Klein et al. | |
| 9,369,433 B1 | 6/2016 | Paul et al. | |
| 9,449,180 B2 | 9/2016 | O'Hare et al. | |
| 9,449,319 B1 | 9/2016 | Agarwal et al. | |
| 9,454,526 B1 | 9/2016 | Kapoor et al. | |
| 9,465,368 B1 | 10/2016 | Mitter et al. | |
| 9,503,451 B1 | 11/2016 | Kane-Parry et al. | |
| 9,509,688 B1 | 11/2016 | Magi Shaashua et al. | |
| 9,516,035 B1 | 12/2016 | Moritz et al. | |
| 9,577,999 B1 | 2/2017 | Lindemann | |
| 9,635,000 B1 | 4/2017 | Muftic | |
| 9,635,011 B1 | 4/2017 | Wu et al. | |
| 9,639,689 B1 | 5/2017 | Herskovic et al. | |
| 9,654,469 B1 | 5/2017 | Yang | |
| 9,749,140 B2 | 8/2017 | Oberhauser et al. | |
| 9,838,384 B1 | 12/2017 | Kane-Parry et al. | |
| 9,870,562 B2 | 1/2018 | Davis et al. | |
| 9,887,983 B2 | 2/2018 | Lindemann et al. | |
| 9,906,519 B1 | 2/2018 | Kotamraju | |
| 9,954,867 B1 | 4/2018 | Johansson et al. | |
| 10,026,082 B2 | 7/2018 | Davis | |
| 10,075,334 B1 | 9/2018 | Kozura et al. | |
| 10,078,743 B1 | 9/2018 | Baldi et al. | |
| 10,097,356 B2 | 10/2018 | Zinder | |
| 10,102,510 B2 | 10/2018 | Yau et al. | |
| 10,121,143 B1 | 11/2018 | Madisetti et al. | |
| 10,163,079 B1 | 12/2018 | Brock et al. | |
| 10,176,310 B2 | 1/2019 | Baghdasaryan | |
| 10,592,882 B1 | 3/2020 | Viswanath et al. | |
| 10,686,781 B1 | 6/2020 | Kaditz et al. | |
| 10,829,088 B2 | 11/2020 | Jarvis et al. | |
| 11,316,844 B2 | 4/2022 | Krishnaiah | |
| 11,403,630 B2 | 8/2022 | Dua | |
| 11,432,149 B1 * | 8/2022 | Dhanoa | G06F 21/36 |
| 11,729,616 B1 * | 8/2023 | Dhanoa | H04W 12/068 726/6 |
| 12,143,816 B2 * | 11/2024 | Dhanoa | H04W 12/068 |
| 2001/0049785 A1 | 12/2001 | Kawan et al. | |
| 2002/0007453 A1 | 1/2002 | Nemovicher | |
| 2002/0025062 A1 | 2/2002 | Black | |
| 2002/0026575 A1 | 2/2002 | Wheeler et al. | |
| 2002/0035542 A1 | 3/2002 | Tumey et al. | |
| 2002/0054587 A1 | 5/2002 | Baker et al. | |
| 2002/0073213 A1 | 6/2002 | Mekata et al. | |
| 2002/0112177 A1 | 8/2002 | Voltmer et al. | |
| 2002/0178380 A1 | 11/2002 | Wolf et al. | |
| 2002/0184103 A1 | 12/2002 | Shah et al. | |
| 2003/0014372 A1 | 1/2003 | Wheeler et al. | |
| 2003/0023695 A1 | 1/2003 | Kobata et al. | |
| 2003/0023874 A1 | 1/2003 | Prokupets et al. | |
| 2003/0026462 A1 | 2/2003 | Chung et al. | |
| 2003/0028427 A1 | 2/2003 | Dutta et al. | |

(56) References Cited

U.S. PATENT DOCUMENTS

| | | |
|---|---|---|
| 2003/0048173 A1 | 3/2003 | Shigematsu et al. |
| 2003/0056092 A1 | 3/2003 | Edgett et al. |
| 2003/0056096 A1 | 3/2003 | Albert et al. |
| 2003/0061503 A1 | 3/2003 | Katz et al. |
| 2003/0065626 A1 | 4/2003 | Allen |
| 2003/0065919 A1 | 4/2003 | Albert et al. |
| 2003/0097570 A1 | 5/2003 | Wheeler et al. |
| 2003/0097597 A1 | 5/2003 | Lewis |
| 2003/0101136 A1 | 5/2003 | Wheeler et al. |
| 2003/0103653 A1 | 6/2003 | Avni et al. |
| 2003/0105725 A1 | 6/2003 | Hoffman |
| 2003/0115142 A1 | 6/2003 | Brickell et al. |
| 2004/0019570 A1 | 1/2004 | Bolle et al. |
| 2004/0054911 A1 | 3/2004 | Chennakeshu et al. |
| 2004/0059924 A1 | 3/2004 | Soto et al. |
| 2004/0059952 A1 | 3/2004 | Newport et al. |
| 2004/0097217 A1 | 5/2004 | Mcclain |
| 2004/0133778 A1 | 7/2004 | Madani |
| 2004/0147265 A1 | 7/2004 | Kelley et al. |
| 2004/0177073 A1 | 9/2004 | Snyder et al. |
| 2004/0243832 A1 | 12/2004 | Wilf et al. |
| 2004/0243856 A1 | 12/2004 | Shatford |
| 2005/0010786 A1 | 1/2005 | Michener et al. |
| 2005/0075973 A1 | 4/2005 | Yousofi |
| 2005/0086531 A1 | 4/2005 | Kenrich |
| 2005/0114713 A1 | 5/2005 | Beckman et al. |
| 2005/0160052 A1 | 7/2005 | Schneider et al. |
| 2005/0180618 A1 | 8/2005 | Black |
| 2005/0216824 A1 | 9/2005 | Ferguson et al. |
| 2005/0228887 A1 | 10/2005 | Wang et al. |
| 2005/0234833 A1 | 10/2005 | Vanfleet et al. |
| 2005/0268345 A1 | 12/2005 | Harrison et al. |
| 2005/0289058 A1 | 12/2005 | Hoffman et al. |
| 2006/0004651 A1 | 1/2006 | Corr et al. |
| 2006/0005024 A1 | 1/2006 | Law |
| 2006/0010487 A1 | 1/2006 | Fierer et al. |
| 2006/0020793 A1 | 1/2006 | Rogers et al. |
| 2006/0029261 A1 | 2/2006 | Hoffman et al. |
| 2006/0074986 A1 | 4/2006 | Mallalieu et al. |
| 2006/0090073 A1 | 4/2006 | Steinberg et al. |
| 2006/0095780 A1 | 5/2006 | Hillis et al. |
| 2006/0123092 A1 | 6/2006 | Madams et al. |
| 2006/0143462 A1 | 6/2006 | Jacobs |
| 2006/0165060 A1 | 7/2006 | Dua |
| 2006/0194592 A1 | 8/2006 | Clough |
| 2006/0206709 A1 | 9/2006 | Labrou et al. |
| 2006/0282528 A1 | 12/2006 | Madams et al. |
| 2006/0294387 A1 | 12/2006 | Mccracken et al. |
| 2007/0011261 A1 | 1/2007 | Madams et al. |
| 2007/0050840 A1 | 3/2007 | Grandcolas et al. |
| 2007/0061590 A1 | 3/2007 | Boye et al. |
| 2007/0118745 A1 | 5/2007 | Buer |
| 2007/0198432 A1 | 8/2007 | Pitroda |
| 2007/0198436 A1 | 8/2007 | Weiss |
| 2007/0245158 A1 | 10/2007 | Giobbi et al. |
| 2007/0253553 A1 | 11/2007 | Abdul Rahman et al. |
| 2007/0260544 A1 | 11/2007 | Wankmueller |
| 2007/0266439 A1 | 11/2007 | Kraft |
| 2007/0289011 A1 | 12/2007 | Heath et al. |
| 2007/0291995 A1 | 12/2007 | Rivera |
| 2008/0046988 A1 | 2/2008 | Baharis et al. |
| 2008/0120240 A1 | 5/2008 | Ginter et al. |
| 2008/0129447 A1 | 6/2008 | Choi et al. |
| 2008/0172341 A1 | 7/2008 | Crandell |
| 2008/0172382 A1 | 7/2008 | Prettejohn |
| 2008/0275748 A1 | 11/2008 | John |
| 2008/0319915 A1 | 12/2008 | Russell et al. |
| 2008/0320151 A1 | 12/2008 | Mccanne et al. |
| 2009/0049301 A1 | 2/2009 | Hamid et al. |
| 2009/0055910 A1 | 2/2009 | Lee |
| 2009/0069050 A1 | 3/2009 | Jain et al. |
| 2009/0070691 A1 | 3/2009 | Jain |
| 2009/0106556 A1 | 4/2009 | Hamid |
| 2009/0119214 A1 | 5/2009 | Delolme et al. |
| 2009/0138405 A1 | 5/2009 | Blessing |
| 2009/0171850 A1 | 7/2009 | Yuval |
| 2009/0189736 A1 | 7/2009 | Hayashi |
| 2009/0260064 A1 | 10/2009 | Mcdowell et al. |
| 2009/0264070 A1 | 10/2009 | Lim |
| 2009/0292641 A1 | 11/2009 | Weiss |
| 2009/0294523 A1 | 12/2009 | Marano et al. |
| 2010/0036772 A1 | 2/2010 | Arceneaux |
| 2010/0049659 A1 | 2/2010 | Cassone |
| 2010/0070377 A1 | 3/2010 | Williams et al. |
| 2010/0115583 A1 | 5/2010 | Delia et al. |
| 2010/0180327 A1 | 7/2010 | Sheets et al. |
| 2010/0180328 A1 | 7/2010 | Moas et al. |
| 2010/0191652 A1 | 7/2010 | Eckert et al. |
| 2010/0229245 A1 | 9/2010 | Singhal |
| 2011/0006880 A1 | 1/2011 | Long et al. |
| 2011/0086616 A1 | 4/2011 | Brand et al. |
| 2011/0099112 A1 | 4/2011 | Mages et al. |
| 2011/0185181 A1 | 7/2011 | Lin |
| 2011/0207434 A1 | 8/2011 | Rozhkov |
| 2011/0219230 A1 | 9/2011 | Oberheide et al. |
| 2011/0221568 A1 | 9/2011 | Giobbi |
| 2011/0224509 A1 | 9/2011 | Fish et al. |
| 2011/0238517 A1 | 9/2011 | Ramalingam et al. |
| 2011/0246817 A1 | 10/2011 | Orsini et al. |
| 2011/0265149 A1 | 10/2011 | Ganesan |
| 2011/0270751 A1 | 11/2011 | Csinger et al. |
| 2011/0289092 A1 | 11/2011 | Kumar et al. |
| 2011/0302273 A1 | 12/2011 | Pfitzmann et al. |
| 2012/0011016 A1 | 1/2012 | Williams et al. |
| 2012/0066262 A1 | 3/2012 | Greenberg |
| 2012/0072353 A1 | 3/2012 | Boone et al. |
| 2012/0079581 A1 | 3/2012 | Patterson et al. |
| 2012/0110341 A1 | 5/2012 | Beigi |
| 2012/0124651 A1 | 5/2012 | Ganesan et al. |
| 2012/0131657 A1 | 5/2012 | Sunstein et al. |
| 2012/0240198 A1 | 9/2012 | Shannon |
| 2012/0272056 A1 | 10/2012 | Ganesan |
| 2013/0006862 A1 | 1/2013 | Graham |
| 2013/0007874 A1 | 1/2013 | Purvis |
| 2013/0013931 A1 | 1/2013 | O'Hare et al. |
| 2013/0036370 A1 | 2/2013 | Ananthakrishnan |
| 2013/0055346 A1 | 2/2013 | Singh et al. |
| 2013/0061091 A1 | 3/2013 | Moore et al. |
| 2013/0061333 A1 | 3/2013 | Davis et al. |
| 2013/0091172 A1 | 4/2013 | Kelesis |
| 2013/0124292 A1 | 5/2013 | Juthani |
| 2013/0130623 A1 | 5/2013 | Hozanne et al. |
| 2013/0145360 A1 | 6/2013 | Ricci |
| 2013/0179681 A1 | 7/2013 | Benson et al. |
| 2013/0185210 A1 | 7/2013 | Dodson et al. |
| 2013/0198834 A1 | 8/2013 | Kirsch |
| 2013/0212655 A1 | 8/2013 | Hoyos et al. |
| 2013/0223279 A1 | 8/2013 | Tinnakornsrisuphap et al. |
| 2013/0251216 A1 | 9/2013 | Smowton et al. |
| 2013/0268589 A1 | 10/2013 | Torgersrud et al. |
| 2013/0282637 A1 | 10/2013 | Costigan et al. |
| 2013/0282844 A1 | 10/2013 | Logan et al. |
| 2013/0318580 A1 | 11/2013 | Gudlavenkatasiva et al. |
| 2013/0332342 A1 | 12/2013 | Kasower |
| 2013/0332353 A1 | 12/2013 | Aidasani et al. |
| 2013/0333006 A1 | 12/2013 | Tapling et al. |
| 2014/0020089 A1 | 1/2014 | Perini |
| 2014/0033273 A1 | 1/2014 | Rathbun |
| 2014/0040989 A1 | 2/2014 | Davis et al. |
| 2014/0047560 A1 | 2/2014 | Meyer et al. |
| 2014/0074658 A1 | 3/2014 | Sanchez |
| 2014/0074696 A1 | 3/2014 | Glaser |
| 2014/0075525 A1 | 3/2014 | Ferlin |
| 2014/0088987 A1 | 3/2014 | Backhaus |
| 2014/0089121 A1 | 3/2014 | Kaminsky et al. |
| 2014/0108170 A1 | 4/2014 | Tamari et al. |
| 2014/0143831 A1 | 5/2014 | Fieweger |
| 2014/0149747 A1 | 5/2014 | Bowers |
| 2014/0162598 A1 | 6/2014 | Villa-Real |
| 2014/0165184 A1 | 6/2014 | Lange |
| 2014/0183269 A1 | 7/2014 | Glaser |
| 2014/0201538 A1 | 7/2014 | O'Hare et al. |
| 2014/0237578 A1 | 8/2014 | Cowles et al. |
| 2014/0244744 A1 | 8/2014 | Lyren |

(56) References Cited

U.S. PATENT DOCUMENTS

| | | |
|---|---|---|
| 2014/0250128 A1 | 9/2014 | Akin et al. |
| 2014/0279514 A1 | 9/2014 | Sharp |
| 2014/0282978 A1 | 9/2014 | Lerner et al. |
| 2014/0283113 A1 | 9/2014 | Hanna |
| 2014/0289790 A1 | 9/2014 | Wilson |
| 2014/0289833 A1 | 9/2014 | Briceno et al. |
| 2014/0289867 A1 | 9/2014 | Bukai |
| 2014/0306833 A1 | 10/2014 | Ricci |
| 2014/0309789 A1 | 10/2014 | Ricci |
| 2014/0310075 A1 | 10/2014 | Ricci |
| 2014/0310160 A1 | 10/2014 | Kumar et al. |
| 2014/0310174 A1 | 10/2014 | Heeter |
| 2014/0310786 A1 | 10/2014 | Harding |
| 2014/0333415 A1 | 11/2014 | Kursun et al. |
| 2014/0337243 A1 | 11/2014 | Dutt et al. |
| 2014/0337930 A1 | 11/2014 | Hoyos et al. |
| 2014/0357187 A1 | 12/2014 | Ehrensvärd |
| 2014/0357295 A1 | 12/2014 | Skomra et al. |
| 2014/0363058 A1 | 12/2014 | Emmett et al. |
| 2015/0033299 A1 | 1/2015 | Borovikov |
| 2015/0033305 A1 | 1/2015 | Shear et al. |
| 2015/0039315 A1 | 2/2015 | Gross |
| 2015/0058931 A1 | 2/2015 | Miu et al. |
| 2015/0059003 A1 | 2/2015 | Bouse |
| 2015/0073987 A1 | 3/2015 | Dutt |
| 2015/0106195 A1 | 4/2015 | Holman et al. |
| 2015/0106288 A1 | 4/2015 | Holman et al. |
| 2015/0106949 A1 | 4/2015 | Holman et al. |
| 2015/0131870 A1 | 5/2015 | Hudson et al. |
| 2015/0135300 A1 | 5/2015 | Ford |
| 2015/0172257 A1 | 6/2015 | Truitt et al. |
| 2015/0188891 A1 | 7/2015 | Grange et al. |
| 2015/0189505 A1 | 7/2015 | Marien |
| 2015/0203125 A1 | 7/2015 | Penilla et al. |
| 2015/0205944 A1 | 7/2015 | Turgeman |
| 2015/0205955 A1 | 7/2015 | Turgeman |
| 2015/0205957 A1 | 7/2015 | Turgeman et al. |
| 2015/0205958 A1 | 7/2015 | Turgeman et al. |
| 2015/0210287 A1 | 7/2015 | Penilla et al. |
| 2015/0213246 A1 | 7/2015 | Turgeman et al. |
| 2015/0213251 A1 | 7/2015 | Turgeman |
| 2015/0227938 A1 | 8/2015 | Smets et al. |
| 2015/0237026 A1 | 8/2015 | Kumar |
| 2015/0237045 A1 | 8/2015 | Blessing |
| 2015/0249663 A1 | 9/2015 | Svigals |
| 2015/0261948 A1 | 9/2015 | Marra et al. |
| 2015/0269946 A1 | 9/2015 | Jones |
| 2015/0271777 A1 | 9/2015 | Torgersrud et al. |
| 2015/0278820 A1 | 10/2015 | Meadows |
| 2015/0286813 A1 | 10/2015 | Jakobsson |
| 2015/0287018 A1 | 10/2015 | Iqbal et al. |
| 2015/0310188 A1 | 10/2015 | Ford et al. |
| 2015/0319158 A1 | 11/2015 | Kumnick |
| 2015/0326559 A1 | 11/2015 | Kuang et al. |
| 2015/0326565 A1 | 11/2015 | Kuang et al. |
| 2015/0332274 A1 | 11/2015 | Prodam et al. |
| 2015/0341370 A1 | 11/2015 | Khan |
| 2015/0347713 A1 | 12/2015 | Seeger |
| 2015/0347734 A1 | 12/2015 | Beigi |
| 2015/0348032 A1 | 12/2015 | Ioveva et al. |
| 2015/0356316 A1 | 12/2015 | Thompson et al. |
| 2015/0363986 A1 | 12/2015 | Hoyos et al. |
| 2015/0379488 A1 | 12/2015 | Ruff et al. |
| 2015/0381602 A1 | 12/2015 | Grim et al. |
| 2015/0381603 A1 | 12/2015 | Jakobsson |
| 2015/0381633 A1 | 12/2015 | Grim et al. |
| 2015/0381664 A1 | 12/2015 | Bruno et al. |
| 2015/0382195 A1 | 12/2015 | Grim et al. |
| 2016/0006716 A1 | 1/2016 | Rothberg |
| 2016/0012446 A1 | 1/2016 | Parnell |
| 2016/0028715 A1 | 1/2016 | Sivashanmugam et al. |
| 2016/0036798 A1 | 2/2016 | Mulhearn et al. |
| 2016/0036805 A1 | 2/2016 | Lin |
| 2016/0048700 A1 | 2/2016 | Stransky-Heilkron |
| 2016/0050199 A1 | 2/2016 | Ganesan |
| 2016/0050318 A1 | 2/2016 | Lu et al. |
| 2016/0055322 A1 | 2/2016 | Thomas |
| 2016/0063235 A1 | 3/2016 | Tussy |
| 2016/0065592 A1 | 3/2016 | Svigals |
| 2016/0071390 A1 | 3/2016 | Sales et al. |
| 2016/0072800 A1 | 3/2016 | Soon-Shiong et al. |
| 2016/0072840 A1 | 3/2016 | Iyer et al. |
| 2016/0087952 A1 | 3/2016 | Tartz et al. |
| 2016/0094546 A1 | 3/2016 | Innes et al. |
| 2016/0109954 A1 | 4/2016 | Harris et al. |
| 2016/0110771 A1 | 4/2016 | Klein et al. |
| 2016/0127358 A1 | 5/2016 | Engelking |
| 2016/0134488 A1 | 5/2016 | Straub et al. |
| 2016/0140331 A1 | 5/2016 | Perez |
| 2016/0156664 A1 | 6/2016 | Nagaratnam et al. |
| 2016/0162900 A1 | 6/2016 | Dutt et al. |
| 2016/0164866 A1 | 6/2016 | Oberheide et al. |
| 2016/0164880 A1 | 6/2016 | Colesa et al. |
| 2016/0164958 A1 | 6/2016 | Sharan |
| 2016/0165036 A1 | 6/2016 | Leow |
| 2016/0171361 A1 | 6/2016 | Chatterton et al. |
| 2016/0182503 A1 | 6/2016 | Cheng et al. |
| 2016/0189147 A1 | 6/2016 | Vanczak |
| 2016/0191511 A1 | 6/2016 | Tijerina et al. |
| 2016/0191514 A1 | 6/2016 | Talmor et al. |
| 2016/0219024 A1 | 7/2016 | Verzun et al. |
| 2016/0224782 A1 | 8/2016 | Miyakawa |
| 2016/0226862 A1 | 8/2016 | Song |
| 2016/0232339 A1 | 8/2016 | Yang et al. |
| 2016/0253675 A1 | 9/2016 | Remillet |
| 2016/0269181 A1 | 9/2016 | Hon et al. |
| 2016/0277412 A1 | 9/2016 | Streuter et al. |
| 2016/0308858 A1 | 10/2016 | Nordstrom et al. |
| 2016/0314462 A1 | 10/2016 | Hong et al. |
| 2016/0335426 A1 | 11/2016 | Cherry et al. |
| 2016/0337334 A1 | 11/2016 | Murr |
| 2016/0342989 A1 | 11/2016 | Davis |
| 2016/0342994 A1 | 11/2016 | Davis |
| 2016/0357954 A1 | 12/2016 | Guionneau et al. |
| 2016/0371697 A1 | 12/2016 | Auvenshine et al. |
| 2016/0378417 A1 | 12/2016 | Kenjalkar |
| 2017/0012951 A1 | 1/2017 | Mennes et al. |
| 2017/0041296 A1 | 2/2017 | Ford et al. |
| 2017/0046560 A1 | 2/2017 | Tsur |
| 2017/0046698 A1 | 2/2017 | Haldenby et al. |
| 2017/0048218 A1 | 2/2017 | Lindemann |
| 2017/0048319 A1 | 2/2017 | Straub |
| 2017/0063550 A1 | 3/2017 | Brodie |
| 2017/0063840 A1 | 3/2017 | Krishnaiah |
| 2017/0076280 A1 | 3/2017 | Castinado et al. |
| 2017/0091757 A1 | 3/2017 | Lloyd et al. |
| 2017/0103194 A1 | 4/2017 | Wechsler |
| 2017/0103408 A1 | 4/2017 | Mazuera |
| 2017/0132630 A1 | 5/2017 | Castinado et al. |
| 2017/0132633 A1 | 5/2017 | Whitehouse |
| 2017/0132643 A1 | 5/2017 | Sagade et al. |
| 2017/0148009 A1 | 5/2017 | Perez Lafuente |
| 2017/0242961 A1 | 8/2017 | Shukla et al. |
| 2017/0243208 A1 | 8/2017 | Kurian et al. |
| 2017/0250972 A1 | 8/2017 | Ronda et al. |
| 2017/0293912 A1 | 10/2017 | Furche et al. |
| 2017/0318007 A1 | 11/2017 | Cleeve |
| 2017/0337545 A1 | 11/2017 | Li |
| 2017/0352012 A1 | 12/2017 | Hearn et al. |
| 2018/0025442 A1 | 1/2018 | Isaacson et al. |
| 2018/0060496 A1 | 3/2018 | Bulleit et al. |
| 2018/0068130 A1 | 3/2018 | Chan et al. |
| 2018/0075421 A1 | 3/2018 | Serrano et al. |
| 2018/0089256 A1 | 3/2018 | Wright, Sr. |
| 2018/0096349 A1 | 4/2018 | Mcdonald et al. |
| 2018/0114218 A1 | 4/2018 | Konik et al. |
| 2018/0130050 A1 | 5/2018 | Taylor et al. |
| 2018/0191740 A1 | 7/2018 | Decenzo et al. |
| 2018/0204191 A1 | 7/2018 | Wilson et al. |
| 2018/0227275 A1 | 8/2018 | Russinovich et al. |
| 2018/0308072 A1 | 10/2018 | Smith et al. |
| 2018/0315055 A1 | 11/2018 | Pickover et al. |
| 2018/0316507 A1 | 11/2018 | Smith et al. |
| 2018/0322588 A1 | 11/2018 | Linne |

(56) References Cited

U.S. PATENT DOCUMENTS

| | | |
|---|---|---|
| 2018/0343120 A1 | 11/2018 | Andrade |
| 2018/0343126 A1 | 11/2018 | Fallah |
| 2018/0349896 A1 | 12/2018 | Arora et al. |
| 2018/0349968 A1 | 12/2018 | O'Brien et al. |
| 2018/0367310 A1 | 12/2018 | Leong et al. |
| 2018/0373983 A1 | 12/2018 | Katz et al. |
| 2019/0012662 A1 | 1/2019 | Krellenstein et al. |
| 2019/0018984 A1 | 1/2019 | Setty et al. |
| 2019/0019144 A1 | 1/2019 | Gillen |
| 2019/0019180 A1 | 1/2019 | Coburn et al. |
| 2019/0020653 A1 | 1/2019 | Brown et al. |
| 2019/0020661 A1 | 1/2019 | Zhang |
| 2019/0026685 A1 | 1/2019 | Chappell et al. |
| 2019/0028276 A1 | 1/2019 | Pierce et al. |
| 2019/0034716 A1 | 1/2019 | Kamarol et al. |
| 2019/0035018 A1 | 1/2019 | Nolan et al. |
| 2019/0036887 A1 | 1/2019 | Miller |
| 2019/0043050 A1 | 2/2019 | Smith et al. |
| 2019/0319939 A1 | 10/2019 | Hamel |
| 2020/0014541 A1 | 1/2020 | Streit |
| 2020/0169415 A1 | 5/2020 | Schmidt |
| 2021/0027295 A1 | 1/2021 | Raquepaw et al. |

FOREIGN PATENT DOCUMENTS

| | | |
|---|---|---|
| WO | WO-2018/165472 A1 | 9/2018 |
| WO | WO-2018/172439 A1 | 9/2018 |
| WO | WO-2018/204541 A1 | 11/2018 |
| WO | WO-2018/223125 A1 | 12/2018 |
| WO | WO-2019/009913 A1 | 1/2019 |
| WO | WO-2019/009914 A1 | 1/2019 |

OTHER PUBLICATIONS

Liu et al., "The Organizational Structure in Collaboration Information Gathering," 2001, IEEE, pp. 263-268.

Liu et al "A Survey of Payment Card Industry Data Security Standard," 2010, IEEE Communications Surveys & Tutorials, vol. 12, No. 3, Third Quarter 2010, pp. 287-303.

Ranchi et al "Security, Privacy and Efficiency of Internet Banking Transactions," 2011, IEEE, pp. 216-222.

Shakshuki et al., "A Multi-Agent System Architecture for Information Gathering," 2000, IEEE, pp. 732-736.

Stockel, A., "Securing Data and Financial Transactions," 1995, IEEE, pp. 397-401.

Su et al "A Service Level Agreement for the Resource Transaction Risk based on Cloud Bank Model," 2012 International Conference on Cloud Computing and Service Computing, IEEE Computer Society, pp. 198-203.

Zhang et al., "A Method of Predicting Users' Behaviors Based on Inter-transaction Association Rules," 2009 Sixth Web Information Systems and Applications Conference, IEEE Computer Society, pp. 147-150.

Zhi-Min et al "Analysis of State-Owned Commercial Banks On-Line Sites Frequent Transactions and Structure Equation Modeling Archive," 2012 2nd International Conference on Computer Science and Network Technology, pp. 401-405 (Year: 2012).

* cited by examiner

SELF-SOVEREIGN IDENTIFICATION VIA DIGITAL CREDENTIALS FOR IDENTITY ATTRIBUTES

CROSS-REFERENCE TO RELATED APPLICATIONS

This application is a continuation of U.S. patent application Ser. No. 18/226,566 filed Jul. 26, 2023, which is a continuation of U.S. patent application Ser. No. 17/898,108 filed Aug. 29, 2022, which is a continuation of U.S. patent application Ser. No. 16/598,904 filed Oct. 10, 2019, each of which is incorporated herein by reference in its entirety.

TECHNICAL FIELD

The present disclosure relates to generation, management, and use of digital credentials with individual identity attributes validated by various trusted entities.

BACKGROUND

Traditional methods for presenting identification lead to unnecessary disclosure of extraneous information not requested (or desired) by recipients, posing a significant challenge to privacy and security. Conventional identification documents (such as a person's driver's license or passport), which can reveal a large set of personal information that should remain confidential, are issued by, and accepted from, a limited number of authorities and are not tailored to particular situations.

SUMMARY

Various embodiments of the disclosure relate to a method implemented via a mobile device. The mobile device may run a mobile application comprising, or having access to, an identity wallet. The identity wallet may comprise one or more digital credentials. The digital credentials may be stored at the mobile device and/or at a remote system such as, for example, a credential management system or other wallet provider system. The method may comprise receiving a first signal corresponding with an identity request. The first signal may be received by the mobile device from a receiver device. The receiver device may be associated with, or may be a part of, an entity or entities (healthcare or financial organizations, governmental bodies, smart devices, etc.) requesting or requiring demonstration or proof of one or more identity attributes. The receiver device may be a smart device or may request and/or accept digital credentials for a smart device. The method may comprise determining that the identity request of the first signal comprises a request to prove an identity attribute. That the identity request of the first signal comprises the request to prove the identity attribute may be determined at the mobile device, such as by the mobile application, or the mobile application may transmit the first signal (or a version thereof) to a remote system or other computing device, and the result of the determination may be transmitted back to the mobile device following the determination by the remote system or the other computing device. The method may comprise identifying a digital credential, in the identity wallet, corresponding to the identity attribute. The identified digital credential may attest to the identity attribute. The digital credential may include or identify the identity attribute or other identity data (or a pointer thereto). The digital credential may, alternatively or additionally, include or identify a digital key (or pointer thereto) associated with an ID issuer or other trusted entity, and/or information on a distributed ledger enabling, for example, verification of the digital credential using blockchain technology. The digital key and/or distributed ledger may indicate or demonstrate that the trusted entity has validated certain identity data of the user. The digital credential (e.g., in an accessible identity wallet) that would serve to prove the requested identity attribute may be identified by the mobile device (e.g., by the mobile application, which runs on the mobile device, accessing the identity wallet or records associated therewith). The method may comprise displaying a graphical user interface (GUI) via one or more user interfaces (e.g., via a display screen) of the mobile computing device. The GUI may be displayed by the mobile application. The GUI may comprise a list with one or more selectable identity attributes and/or one or more digital credentials corresponding with and validating one or more identity attributes. The list may, for each identity attribute and/or digital credential, provide an identification of the corresponding validating entity. The list may include the one or more digital credentials of the trusted entity that attests to or validates the identity attribute. The digital credential and/or identity attribute may be selectable via one or more user interfaces (e.g., via touchscreen or other input mechanism) of the mobile device. The method may comprise receiving a second signal generated by the mobile device, such as by an operating system or other component of the mobile device that, for example, is capable of sensing inputs into one or more user interfaces of the mobile device. The second signal may be received by the mobile application. The second signal may indicate selection of the digital credential and/or identity attribute in the list, such as selection by a user via a touchscreen display used to visually present the GUI with the list. The method may comprise generating a third signal. The third signal may be for provisioning to the receiver device. The third signal may be generated by the mobile device (e.g., by the mobile application running on the mobile device). The third signal may comprise the digital credential (or pointer thereto). The third signal may additionally or alternatively identify the trusted entity corresponding with the digital credential.

In one or more embodiments, the digital credential may be a first digital credential and the trusted entity may be a first trusted entity. The list may identify a second digital credential. The second digital credential may be in the identity wallet. The second digital credential may attest to the same identity attribute attested to by the first digital credential. The second digital credential may have been validated by a second trusted entity distinct from the first trusted entity.

In one or more embodiments, the GUI may be configured to allow a user to select from among multiple digital certificates of multiple trusted entities for proving multiple identity attributes to the receiver device.

In one or more embodiments, the identity attribute may be an extrapolation from identity data elements of a user. The extrapolation may be a deduction or induction from identity data elements. Identity data elements may be data received from one or more sources, and extrapolations may be information about the user that is not itself received (e.g., from a single source) but may be ascertained from received data (e.g., by combining data from one source with other ascertainable facts or by combining data from two or more sources).

In one or more embodiments, the extrapolation may be a determination as to whether the user has reached a minimum age. The determination may be based on a birthdate of the user, which may be an identity data element received from one or more sources. The digital credential may attest to the user having reached the minimum age.

In one or more embodiments, example extrapolations include whether a user is at least 18, 21, 35, or 65, or is between a certain age range such as between 18 and 25 (based on, e.g., the user's birthdate and the current date), whether a user is authorized to operate a vehicle or machinery (based on, e.g., a license and a determination that the license is unexpired based on the current date or is otherwise valid), whether a user is a property owner (based on, e.g., a title or deed and a determination that the title or deed has been properly recorded or executed or is otherwise deemed valid), and so forth. In certain implementations, an extrapolation may yield a binary response (true/false, yes/no, up/down, valid/invalid, on/off, etc.), a range of values (e.g., between 13 and 19 and therefore a teenager), a category (e.g., membership in a club or other organization, being in good standing, or belonging to a class such as being a senior citizen or being a veteran), a number, or any continuous or discrete values.

In one or more embodiments, the method may comprise displaying an image of the user. Alternatively or additionally, the method may comprise displaying an icon indicating the extrapolation (e.g., that the user is at least the minimum age). Alternatively or additionally, the method may comprise displaying an identification of the first trusted entity. The image, icon, and/or identification of the first trusted entity may be displayed by the mobile application on a display screen of the mobile device.

In one or more embodiments, the first signal may be a code displayed on a display device. The code may be displayed by the receiver device on a display screen of the receiver device. Receiving the first signal may comprise the mobile application using an imager, such as a camera or other light sensor, of the mobile device to scan or otherwise detect the displayed code.

In one or more embodiments, the code may be a QR code, a barcode, and/or a set of one or more symbols. The QR code and/or barcode may be displayed by the receiver device. Determining that the QR code and/or barcode comprises the request for the identity attribute may comprise the mobile application deciphering or otherwise analyzing the QR code and/or barcode.

In one or more embodiments, the first signal may be a wireless communication. The wireless communication may be transmitted by the receiver device. The wireless communication may be transmitted directly to the mobile device, such as by device-to-device communication that does not require a network such as the Internet. The wireless communication may be a near-field communication (NFC). The NFC communication may involve, for example, the receiver device and the mobile device. The wireless communication may alternatively or additionally be via another communication protocol such as Bluetooth, Wi-Fi, wireless broadband, etc.

In one or more embodiments, the third signal may comprise a code that includes, points to, or otherwise represents the first credential. The method may comprise displaying the code. The code may be displayed via the one or more user interfaces of the mobile device, such as a display screen of the mobile device.

In one or more embodiments, the third signal may comprise a message with the first digital credential. The method may comprise wirelessly transmitting the message. The message may be transmitted to the receiver device. The message may be transmitted by the mobile device. Wirelessly transmitting the message may comprise directly transmitting the message to the receiver device from the mobile device. The message may be directly transmitted via NFC. Alternatively or additionally, the message may be transmitted via a network, such as the Internet.

Various embodiments of the disclosure relate to a method implemented via a mobile device running a mobile application that has access to an identity wallet which includes digital credentials. The method may comprise receiving a signal corresponding with an identity request. The signal may be received by the mobile device. The signal may be received from a receiver device. The method may comprise displaying a graphical user interface (GUI). The GUI may be displayed by the mobile application. The GUI may be displayed via one or more user interfaces of the mobile computing device, such as a display screen. The GUI may comprise selectable identity attributes. The GUI may comprise, for each identity attribute, an identification of a corresponding validating entity. The method may comprise receiving one or more selections of one or more of the identity attributes. The one or more selections may be received by the mobile application. The one or more selections may be received, for example, from the display screen of the mobile device and/or via an operating system of the mobile device. The method may comprise provisioning one or more digital credentials attesting to the selected identity attributes. The one or more digital credentials may be provisioned by the mobile application. The one or more digital credentials may be provisioned to the receiver device.

In one or more embodiments, the identity attributes may be selectable by, for example, attribute category (e.g., health related, physical attributes, travel, employment, family, etc.), ID set (associated with, e.g., a driver's license, passport, insurance card, or other identification), ID issuer (deemed to be an entity trusted to validate identity attributes in generation of digital credentials), etc.

In one or more embodiments, provisioning the one or more digital credentials may comprise displaying one or more codes. The one or more codes may be displayed via the one or more user interfaces of the mobile device, such as via a display screen of the mobile device. The one or more codes may be displayed for the receiver device. The one or more codes may comprise the one or more digital credentials attesting to the selected identity attributes.

In one or more embodiments, provisioning the one or more digital credentials to the receiver device may comprise transmitting the one or more digital credentials attesting to the selected identity attributes. The one or more digital credentials may be transmitted wirelessly, such as by NFC, Bluetooth, Wi-Fi, wireless broadband, etc. The one or more digital credentials may be transmitted to the receiver device by the mobile device, and/or by a remote system or device involved in validation, issuance, and/or management of digital credentials.

Various embodiments of the disclosure relate to a mobile device running a mobile application. The mobile application may have access to an identity wallet comprising multiple digital credentials. The digital credentials may be validated by multiple ID issuers deemed to be trusted entities. The mobile device may comprise a wireless communications interface. The mobile device may comprise an imager configured to detect ambient light to capture images. The mobile device may comprise one or more user interfaces. The user interfaces may comprise a display device such as a touchscreen display. The one or more user interfaces may be configured for visually presenting graphical elements and for receiving user inputs. The mobile device may comprise a processor and a memory having stored thereon instructions which, when executed by the processor, cause the processor to perform specific functions. The mobile device may be configured to receive a first signal corresponding with an identity request of a receiver device. The first signal may be received via the wireless communications interface and/or via the imager. The mobile device may be configured to determine that the identity request of the first signal comprises a request for proof of validation of one or more identity attributes. The request may require validation by any trusted entity, by a type of trusted entity (e.g., a governmental body or healthcare provider), by a specific trusted entity (e.g., a specific government agency or medical provider). Such requirement related to which trusted entity or trusted entities is or are acceptable or sought-after may be identified in the request. That the identity request comprises a request for, for example, validation of one or more identity attributes (generally, or as validated by a certain trusted entity or type of trusted entity) may be determined via the mobile application. The mobile device may be configured to identify multiple digital credentials in the identity wallet that attest to the identity attributes. The identified digital credentials may have been validated by multiple trusted entities, which may be of different types (e.g., healthcare institution, governmental body, etc.). The digital credentials may identified via the mobile application. The mobile device may be configured to display a graphical user interface (GUI) comprising the digital credentials and/or comprising the identity attributes validated by the identified digital credentials. The GUI may additionally or alternatively comprise an identification of trusted entities corresponding to the digital credentials. The GUI may be displayed via the one or more user interfaces of the mobile device. The digital credentials and/or the identity attributes validated by or otherwise corresponding to the digital credentials may be selectable via the one or more user interfaces. The mobile device may be configured to receive an indication that one or more of the digital credentials presented by the GUI has been selected using the one or more user interfaces. The indication may be received via the mobile application. The indication may be received as a signal from the one or more user interfaces of the mobile device and/or the operating system of the mobile device. The mobile device may be configured to provision the selected digital credentials attesting to the requested identity attributes. The digital credentials may be provisioned to the receiver device. The digital credentials may be provisioned via at least one of the wireless communications interface and the one or more user interfaces (e.g., by being transmitted wirelessly and/or by being displayed as part of a QR or other code on a display screen).

In one or more embodiments, receiving the first signal may comprise detecting a code displayed on a display screen of the receiver device. The code may be detected using the imager of the mobile device. The code may identify the one or more requested identity attributes.

In one or more embodiments, provisioning the selected digital credentials may comprise displaying one or more of the requested identity attributes. Alternatively or additionally, provisioning the selected digital credentials may comprise displaying one or more machine-readable codes. The machine-readable codes may be displayed using a display screen of the mobile device. The machine-readable codes may be configured such that, when scanned and deciphered by the receiver device, the codes reveal one or more of the requested identity attributes and/or digital credentials. The codes may be or comprise, for example, QR codes.

Various embodiments of the disclosure relate to a method implemented via a mobile device running a mobile application, such as an identity wallet application comprising or having access to one or more digital credentials. The method may comprise receiving a first signal corresponding with an identity request. The first signal may be received by the mobile device from a receiver device. The method may comprise determining that the identity request of the first signal comprises a request to prove an identity attribute. That the identity request comprises a request to prove the identity attribute may be determined by the mobile device, such as by or via the mobile application. The method may comprise identifying one or more digital credentials in the identity wallet that attest to the identity attribute. The digital credentials may be identified by or via the mobile application. Each digital credential may have been validated by a different ID issuer deemed to be a trusted entity that attests to or otherwise validates identity attributes. The method may comprise displaying a graphical user interface (GUI). The GUI may be displayed by the mobile application. The GUI may be displayed via one or more user interfaces of the mobile computing device. The GUI may comprise a list with one or more selectable digital credentials and/or identity attributes. The list may, for each digital credential or identity attribute, include an identification of the corresponding validating entity. The list may include the one or more digital credentials that attest to the identity attribute. The digital credentials and/or identity attributes may be selectable via one or more user interfaces of the mobile device. The method may comprise receiving a second signal generated by the mobile device. The second signal may indicate which of the digital credentials and/or identity attributes in the list have been selected. The second signal may be received by the mobile application via, for example, a touchscreen or other input device of, and/or an operating system running on, the mobile device. The method may comprise generating one or more signals comprising the selected digital credentials. The one or more signals may identify the trusted entity for each digital credential. The signals may be generated by the mobile device. The signals may be generated for the receiver device.

In one or more embodiments, the signals may be provisioned to the receiver device. The signals may be provisioned via a wireless transmission, such as a direct wireless communication between the mobile device and the receiver device. The direct wireless communication may be or may comprise one or more of NFC, Bluetooth, Wi-Fi, wireless broadband, etc.

In one or more embodiments, the signals may be provisioned visually. The signals may be provisioned by being displayed via one or more user interfaces, such as a display screen, of the mobile device. The signals may be provisioned by displaying a code, such as a QR code. Provisioning may comprise displaying coded or uncoded versions of one or more of, for example, the digital credential, the corresponding trusted entity, the identity attribute, an image of a user, an extrapolation of data elements, etc.

Various embodiments of the disclosure relate to an approach involving a method, a system, a device, and/or a non-transitory computer readable medium with instructions executable by a processor to cause a system or a computing device, such as a user computing device, to perform specific functions. The approach may involve displaying or causing a display on a user computing device. The display may comprise a plurality of identity attributes pertaining to a user of the user device. Each identity attribute may be validated by an ID issuer, such as a governmental authority or another trusted entity, such as a financial institution, with an incentive to maintain trust and/or prevent fraud. The approach may involve enabling selection by the user of one or more identity attributes among the plurality of identity attributes. The approach may involve provisioning of selected identity attributes to a receiver device. Provisioning may comprise generation of a transmission containing the one or more identity attributes selected by the user of the user device. The transmission may be sent to the receiver device via, for example, NFC or other wireless communication protocol. Alternatively or additionally, the identity attributes may be provisioned to the receiver device via a display of the identity attributes (e.g., in the form of a code such as a QR code) on a display screen of the user device.

Various embodiments of the disclosure relate to an approach involving a method, a system, a device, and/or a non-transitory computer readable medium with instructions executable by a processor to cause a system or a computing device, such as a receiver device, to perform specific functions. The approach may involve enabling selection by a requesting entity such as a smart device or a service provider, via the receiver device, of one or more identity attributes to be requested. The approach may involve displaying by, or causing a display on, a receiver device. The display may comprise a request for one or more identity attributes. The request may be in the form of, for example, a QR code. The approach may additionally or alternatively involve generating a transmission (e.g., by the receiver device) comprising the request for selected identity attributes. The transmission may be sent to the user device directly (e.g., via NFC or otherwise) or via a network (e.g., the Internet). The displayed request may be scanned using a user device of a user and deciphered via the user device to identify the identity attributes being requested. The receiver device may subsequently accept a transmission from the user device. The transmission may contain one or more of the requested identity attributes. Alternatively or additionally, the receiver device may scan or otherwise detect the identity attributes being displayed (e.g., as a code such as a QR code) by the user device (e.g., on a display screen of the user device). The receiver device may compare the received identity attributes to the requested identity attributes to confirm that the requested identity attributes have been provided. The identity attributes may be accompanied by a digital key (or a pointer to where or how the key may be accessed) or identification of a distributed ledger for authentication of the ID issuer and/or for confirmation that the ID issuer validated the identity attribute. The receiver device may then validate the received identity attributes (such as confirming the validity of cryptographic keys to verify that the corresponding trusted entity validated the identity attributes). For example, the receiver device may generate a transmission to a server to obtain information related to the identity attributes and/or validation thereof. The receiver device may then receive a transmission (which may validate the received identity attributes) from the server. The transmission may comprise validating information related to the requested identity attributes received by the receiver device.

Various embodiments relate to a method implemented by a receiver device. The method may comprise detecting a user device. The user device may be detected to be nearby or sufficiently close (e.g., within a threshold distance of the receiver device). The user device may be detected using a wireless communicator (comprising, e.g., a transceiver) of the receiver device. The method may comprise identifying one or more identity attributes to be proved by the user device. The identity attributes may be identified based on the user device. The method may comprise provisioning to the user device a request for proof of identified identity attributes. The method may comprise accepting, using the wireless communicator, a digital credential from the user device. The digital may identify and/or otherwise correspond to an ID issuer. The ID issuer may be claimed to have provided validation of the identity attributes. The method may comprise verifying that the ID issuer validated the identified identity attributes. The method may comprise, in response to verification, granting, the user device access to at least one of a functionality and information.

In one or more embodiments, the receiver device may display a graphical user interface. The graphical user interface may be configured to allow a service provider to select identity attributes to be requested from the user device. The graphical user interface may, alternatively or additionally, be configured to allow a user of the user device to select identity attributes to be provisioned via the user device.

In one or more embodiments, the receiver device may generate a display identifying requested identity attributes. Alternatively or additionally, the receiver device may generate a code (such as a QR code) to be displayed. The code may identify the identity attributes. Alternatively or additionally, the code may identify acceptable ID issuers. The displayed identity attributes or codes therefor may be scanned by the user device and deciphered or otherwise analyzed by the user device.

In one or more implementations, the receiver device may compare the identity attributes corresponding to the received digital credential to the requested identity attributes to confirm that the requested identity attributes have been provided.

In one or more embodiments, the identity attributes may be accompanied by a digital key (or a pointer to where or how the key may be accessed) or identification of a distributed ledger for authentication of the ID issuer and/or for confirmation that the ID issuer validated the identity attribute.

In one or more embodiments, the receiver device may validate the received identity attributes by, for example, confirming the validity of cryptographic keys to verify that the corresponding ID issuer validated the identity attributes.

In one or more embodiments, the receiver device may grant the user device access to a facility by, for example disarming a security system or component thereof. Alternatively or additionally, the receiver device may enable a functionality such as engine start for a vehicle.

Various embodiments of the disclosure relate to an approach involving a method, a system, a device, and/or a non-transitory computer readable medium with instructions executable by a processor to cause a system or a computing device, such as a credential management system, to perform specific functions. The approach may involve receiving a first set of identity data at a first server from a second server, wherein the second server belongs to an ID issuer. The approach may involve associating the received first set of identity data with a digital key pertaining to a user associated with the same key. The approach may involve storing the received first set of identity data and associated digital key at the first server. The approach may involve receiving a transmission at the first server from a first device. The transmission may comprise a second set of identity data associated with the digital key, and a request for verification of the second set of identity data. The approach may involve the first server verifying that the received second set of identity data matches the first set of identity data. The verification may comprise comparing, at the first server, the second set of identity data to the first set of identity data. The verification may comprise determining whether the second set of identity data is associated with the same digital key as the first set of identity data. The verification may comprise determining whether the identity data in the first set sufficiently matches the identity data in the second set. A determination that the first and second sets match may be deemed a verification of the second set of identity data. The approach may involve sending a second transmission from the first server to the first device comprising a message indicating that the second set of identity data is verified.

Various embodiments of the disclosure relate to an approach involving a method, a system, a device, and/or a non-transitory computer readable medium with instructions executable by a processor to cause a system or a computing device, such as an ID issuer system, to perform specific functions. The approach may involve receiving, at a first server, a request from a second server for digitization of identity data pertaining to a user. The first server may be associated with an identity management system. The approach may involve digitizing, via the first server, identity data pertaining to the user to obtain a digital credential. The first server may send a transmission to the second server comprising the digitized credential pertaining to the user. The digital credential may comprise one or more identity attributes or other identity data and a digital key or other cryptographic identifier.

Various embodiments of the disclosure relate to a method implemented via a mobile device running a mobile application having access to an identity wallet with digital credentials. The method may comprise presenting a first graphical user interface (GUI) via one or more user interfaces of the mobile computing device. The first GUI may comprise selectable identity attributes. The first GUI may comprise, for each identity attribute, an identification of a corresponding validating entity. The method may comprise detecting one or more selections of one or more of the identity attributes. The method may comprise identifying in the identity wallet digital credentials proving validation of the selected identity attributes by one or more trusted entities. The method may comprise presenting a second GUI via the one or more user interfaces. The second GUI may comprise selectable digital credentials identified in the identity wallet. The method may comprise detecting one or more selections of one or more of the digital credentials. The method may comprise provisioning, to the receiver device, the one or more selected digital credentials.

In one or more embodiments, the second GUI may comprise a first digital credential corresponding to validation of an identity attribute by a first trusted entity, and a second digital credential corresponding to validation of the same identity attribute by a second trusted entity.

In one or more embodiments, the method may comprise generating a QR with the digital credentials selected via the second GUI. Provisioning the one or more credentials to the receiver device may comprise displaying the QR code for scanning by the receiver device.

Various embodiments of the disclosure relate to a method implemented via a mobile device running a mobile application having access to an identity wallet with one or more digital credentials. The method may comprise biometrically authenticating, using one or more biometric sensors of the mobile device, a user of the mobile device. The method may comprise receiving a signal from a receiver device. The method may comprise determining that the signal includes a request for validation of an identity attribute. The method may comprise identifying one or more digital credentials available in the identity wallet that demonstrate the identity attribute as having been validated by one or more trusted entities. The method may comprise displaying, on a touchscreen of the mobile device, a graphical user interface (GUI) presenting the one or more digital credentials identified as being available in the identity wallet. The GUI may present, for each digital credential, a corresponding trusted entity. The method may comprise detecting selection of one or more of the digital credentials in the GUI via the touchscreen. The method may comprise provisioning the one or more selected digital credentials to the receiver device.

In one or more embodiments, the signal may comprise a visually-perceptible code displayed on a display screen of the receiver device.

In one or more embodiments, receiving the signal may comprise scanning the code, using an imager of the mobile device, as presented on the display screen of the receiver device.

In one or more embodiments, the code may be a QR code.

In one or more embodiments, determining that the signal includes the request may comprise deciphering the visually-perceptible code.

In one or more embodiments, the signal may comprise a wireless transmission from the receiver device.

In one or more embodiments, receiving the signal may comprise detecting, using a wireless communicator of the mobile device, the wireless transmission from the receiver device.

In one or more embodiments, the signal may be emitted by the receiver device via near-field communication (NFC).

In one or more embodiments, provisioning the one or more selected digital credentials may comprise displaying, on a touchscreen, information on validation of the identity attribute.

In one or more embodiments, the displayed information may comprise an image of the user corresponding with the user of the mobile device.

In one or more embodiments, the displayed information may comprise an indication that the identity attribute has been validated by one or more trusted entities and an identification of the one or more trusted entities.

In one or more embodiments, the information may comprise a visually-perceptible code.

In one or more embodiments, the identity attribute may be or may comprise an extrapolation based on identity data validated by one or more trusted entities.

In one or more embodiments, the receiver device may be part of a smart vehicle. The identity attribute may be registration of the smart vehicle to the user.

In one or more embodiments, an engine start function of the smart vehicle may be disabled when the first signal is emitted by the receiver device. The receiver device may be further configured to verify the provisioned digital credential and enable the engine start function of the smart vehicle upon verification of the digital credential.

In one or more embodiments, provisioning the one or more selected digital credentials comprises wirelessly transmitting, using a wireless communicator, the one or more selected digital credentials.

Various embodiments of the disclosure relate to a method implemented via a mobile device running a mobile application having access to an identity wallet with one or more digital credentials. The method may comprise biometrically authenticating, using one or more biometric sensors of the mobile device, a user of the mobile device. The method may comprise scanning, using an imager, a QR code displayed on a display device of a receiver device. The method may comprise determining that the QR code includes a request for validation of an identity attribute. The method may comprise identifying one or more digital credentials available in the identity wallet that demonstrate the identity attribute as having been validated by one or more trusted entities. The method may comprise displaying, on a touchscreen of the mobile device, a graphical user interface (GUI) presenting the one or more digital credentials identified as being available in the identity wallet and, for each digital credential, a corresponding trusted entity. The method may comprise detecting selection of one or more of the digital credentials in the GUI via the touchscreen. The method may comprise displaying, on the touchscreen, a QR code comprising the one or more selected digital credentials for scanning by the receiver device.

Various embodiments of the disclosure relate to a method implemented by a receiver device. The method may comprise detecting a user device within a threshold distance of the receiver device. The user device may be detected using a wireless communicator of the receiver device. The method may comprise identifying one or more identity attributes to be proved by the user device. The method may comprise provisioning a request for proof of identified identity attributes. The request may be provisioned to the user device. The method may comprise accepting a digital credential from the user device. The he digital credential may correspond to a trusted entity. The method may comprise verifying that the trusted entity validated the identified identity attributes. The method may comprise, in response to verification, granting access to an area, a functionality, and/or a source of information.

In one or more implementations, the receiver device is associated with a smart device. The access granted by the receiver device may be access to a subset of functionalities of the smart device.

In one or more implementations, the receiver device may limit functionality of the smart device based on a restriction corresponding to the digital credential. The restriction may be identified by the digital credential. The restriction's association with the digital credential may be determined based known records or records available from another device.

In one or more implementations, the user device may be a first user device and the digital credential may be a first digital credential. The method may comprise accepting a second digital credential. The second digital credential may be accepted from the second user device.

In one or more implementations, the receiver device may require the second digital credential from the second user device before granting access. The requirement for the second digital credential may be based on a restriction identified by or corresponding to the first digital credential.

In one or more implementations, the trusted entity may be, or may represent, an owner of the receiver device. The identity attribute may be authorization to access the area, functionality, or source of information.

In one or more implementations, the receiver device may be associated with a smart vehicle of the trusted entity. The functionality may be engine start.

In one or more implementations, the receiver device may be associated with a home of the trusted entity. The access may be entry into the home.

In one or more implementations, the receiver device may be a smart appliance of the trusted entity. The access may be use of the smart appliance.

In one or more implementations, the receiver device may be a computing device through which an account of the trusted entity is being accessed. The access may be access to the account.

In one or more implementations, the method may comprise receiving a request to access the area, functionality, or source of information. The request may be received from the user device. The request may be received before provisioning the request for proof.

In one or more implementations, the method may comprise receiving from the user device, before provisioning the request for proof, a request to use the receiver device. The request may be received from the user device. The request may be received before provisioning the request for proof.

In one or more implementations, verifying that the trusted entity validated the identified identity attributes may comprise transmitting a request for validation to a device associated with the trusted entity and/or to a credential management system.

In one or more implementations, provisioning the request for proof of identified identity attributes may comprise visually presenting a code. The code may be scannable via the user device. The code may be used to determine the identified identity attributes. the code may be presented via a display screen of the receiver device. The code may be a QR code that is decipherable via the user device.

In one or more implementations, provisioning the request for proof of identified identity attributes may comprise transmitting the request. The request may be transmitted to the user device via the wireless communicator.

In one or more implementations, accepting the digital credential from the user device may comprise scanning a code displayed by the user device on a display screen of the user device.

In one or more implementations, accepting the digital credential from the user device may comprise using the wireless communicator to receive a transmission of the digital credential from the user device.

Various embodiments may relate to a receiver device. The receiver device may comprise a wireless communications interface. The receiver device may comprise one or more user interfaces configured for visually presenting graphical elements and for receiving user inputs. The receiver device may comprise an application layer configured to control access to a functionality of the receiver device. The receiver device may comprise a processor and a memory having stored thereon instructions which, when executed by the processor, cause the processor to perform specific functions. The receiver device may be configured to detect a user device within a threshold distance of the receiver device. The user device may be detected using the wireless communicator. The receiver device may be configured to identify an access and/or functionality to be granted to the user device. The receiver device may be configured to determine one or more identity attributes to be proved by the user device for granting the access or functionality. The receiver device may be configured to provision a request for proof of the determined one or more identity attributes. The request for proof may be provisioned to the user device. The request for proof may be provisioned via the wireless communications interface and/or via the one or more user interfaces. The receiver device may be configured to accept one or more digital credentials. The digital credentials may be accepted from the user device. The digital credentials may be accepted via the wireless communications interface and/or the one or more user interfaces. The one or more digital credentials may correspond to a trusted entity. The receiver device may be configured to verify that the trusted entity validated the determined one or more identity attributes. The receiver device may be configured to grant the access or functionality. The access of functionality may be granted in response to the verification. The access or functionality may be granted via the application layer.

These and other features, together with the organization and manner of operation thereof, will become apparent from the following detailed description and the accompanying drawings.

DETAILED DESCRIPTION

Figure 1:
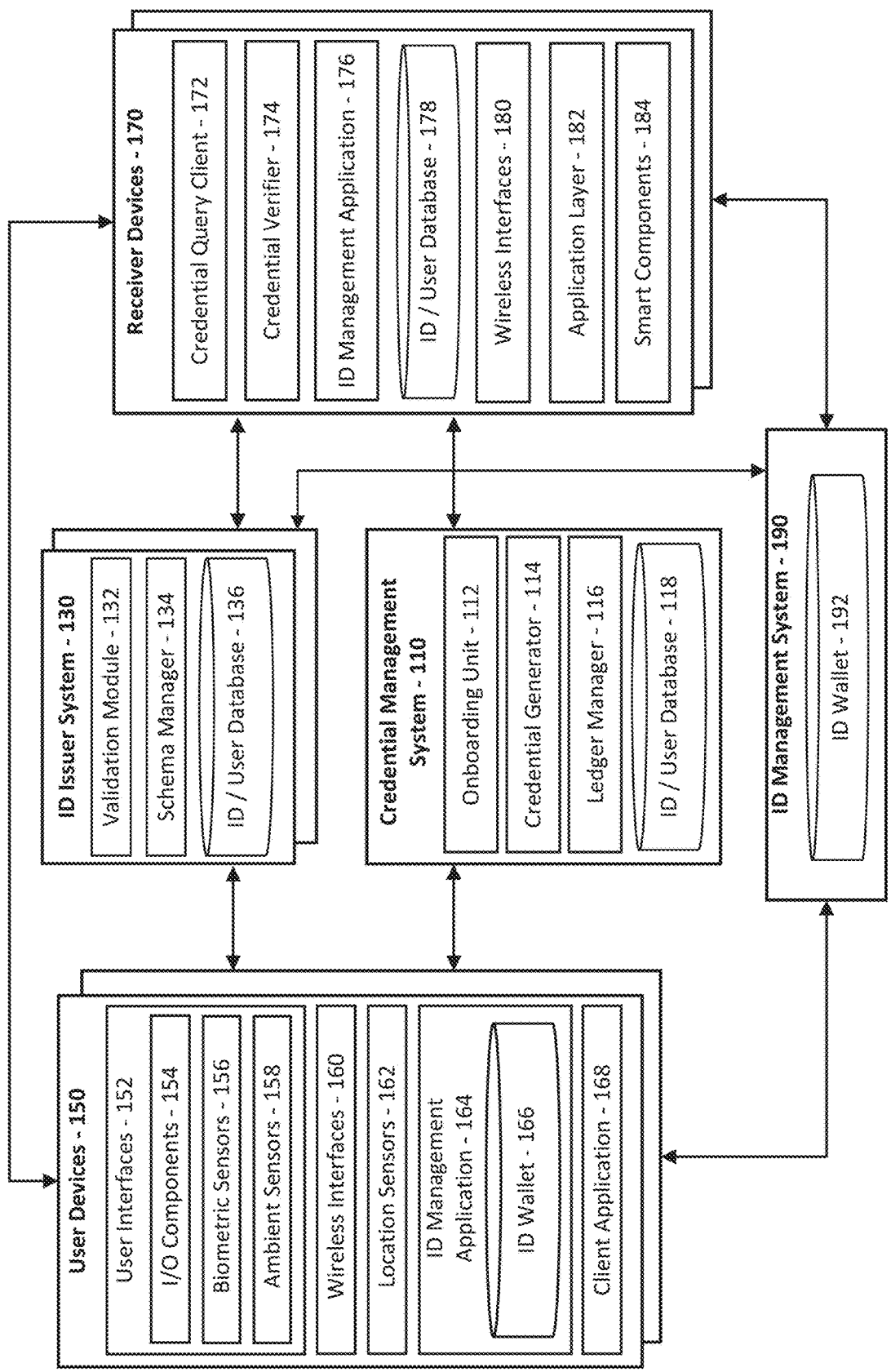
FIG. 1 is a block diagram of a computer-implemented identity management system that includes a credential management system, identification (ID) issuer systems, receiver devices, and user devices, according to example embodiments.

Various embodiments described herein relate to systems and methods for generating, issuing, managing, and provision of digital credentials validated identity attributes. A user's identity may be an accumulation of a user's physical features, associations, relationships, characteristics, and life experiences, and may include identity data elements representing, for example, birthdate, birthplace, height, eye color, name of spouse, travel history, hobbies, residence, employment, business and personal dealings, etc. An identity attribute, as used herein, may include one or more identity data elements (e.g., name, address, birthdate, familial relationships, employment history, health conditions, travel, accounts, etc.) and/or one or more extrapolations based on one or more identity data elements (e.g., an indication that a user is at least a minimum age based on the user's birthdate and the current date, an indication that a user did travel to a country for which a travel warning was in effect based on the user's travel history and travel warnings from government agencies, etc.). Identity attributes may be validated by an ID issuer in generating a digital credential. Digital credentials may include the identity attribute (or a pointer thereto), an associated digital key (or a pointer thereto), and/or an identification of a distributed ledger demonstrating that the identity attribute has been validated by a particular entity. For example, a digital key may associate the identity attribute with the ID issuer certifying the identity attribute, and generating a digital credential may include association of the digital key with the identity attribute. The validation of identity data may be represented in a distributed ledger which may be referenced when authenticating a digital credential or an associated ID issuer.

Advantageously, digital credentials discussed herein provide users with greater control over what aspects of their identities are revealed. The disclosed approach allows users to provision selected identity data as validated by selected ID issuers, helping prevent unnecessary or unwanted disclosure of information. Digital credentials can be configured to contain individual identity attributes, rather than all the information found on a conventional identification document such as a driver's license. For example, a requesting entity may request that a person prove his or her address or that he or she is at least a certain age, and conventionally the person may present a driver's license that reveals more personal information than required or even desired (such as birthdate, height and weight, etc.). In example embodiments of the disclosed approach, a user may present one or more digital credentials to present only the user's address, or only confirmation that the user is at least the minimum age, as validated by one or more than one trusted entity (not necessarily the agency that would issue the driver's license) without revealing the extraneous information.

The disclosed approach also allows users to acquire digital credentials (which can be used to prove identity attributes) from a greater variety and number of entities. For example, a user can use a digital credential with address validated by, for example, a utility company or a financial institution instead of a government agency. Because the recipient of the digital credential may not necessarily require validation of an identity attribute by a specific entity, the user has more options for how to prove identity attributes. Moreover, a user can more easily provide corroboration for an identity attribute by presenting multiple digital credentials to prove an identity attribute as validated by two trusted entities.

In addition to validation being provided by governmental bodies, private entities (e.g., financial institutions or utility companies), or other organizations, validation may be provided by one or more individuals. Owners or managers of assets or properties can validate that one or more individuals have been granted authorization (which may be deemed an identity attribute) to access or use the assets or properties, potentially with identified restrictions (e.g., time limits, limited functionalities, presence of additional entities as may be determined through presentation of additional credentials from user devices of the additional entities, etc.). For example, an owner may grant authorization to use a smart device or enter a secure facility, such as an owner of a smart vehicle, smart appliance, or smart home allowing use of the vehicle or appliance or allowing entry into the home by identified persons, or a manager of a hotel allowing entry into a hotel room upon presentation of digital credentials to a smart lock device. In various examples, the digital credential can be used to demonstrate, for example, not only currently-valid authorization to use a device or enter a facility, but can be used to impose restrictions on such use or entry. Example restrictions include limitations on functionality of a device, limitations on which rooms can be entered, time limits, requirements that one or more other persons also grant authorization, and/or requirements that one or more other persons be present so as to supervise the use or entry.

Additionally, a user may prove identity attributes without unnecessarily sharing biometric data with, or presenting biometric data to, additional devices. For example, instead of presenting biometric data to a smart device to prove identity (and thereby gain access or enable functionality), a user may provide biometric data to his or her own user device, and the user device may authenticate the user and provision digital credentials to prove a digital attribute without sharing or revealing biometric data. By storing the user's biometric data on fewer devices and storage media, it becomes less likely that the data will be compromised or misused (e.g., due to a data breach). Further, users are able to gain access (e.g., via portals accessed using a specialized device, via websites accessed on the Internet, via security systems for physical or virtual domains, etc.) without having to remember, secure, and present various credentials (e.g., personal identification numbers or usernames, passwords, or other login credentials). The disclosure thus provides a more targeted and versatile approach that enhances digital privacy and security.

Referring to FIG. 1, a block diagram of an identity management system 100 for generation, validation, provisioning, and use of digital credentials according to example embodiments is shown. The example system 100 includes a credential management system 110 (of, e.g., an independent body or other entity, and capable of, e.g., managing ID issuers and digital credentials in association with uniquely identified users), which may be implemented using one or more computing devices. The system 100 also includes ID issuer systems 130 (of, e.g., trusted entities, and capable of, e.g., validating identity attributes associated with digital credentials according to various credential schema which define what is included in a particular credential and/or what an ID issuer is validating), user devices 150 (e.g., mobile computing devices, such as smartphones, running an application capable of accessing digital credentials that may be part of an ID wallet and directly provisioning digital credentials or authorizing another device or system to provision digital credentials), receiver devices 170 (e.g., devices of service providers such as merchants, organizations, or individuals requesting proof of one or more identity attributes of users, smart devices confirming identity and/or authorization before granting access or enabling functionality, or other computing devices confirming authorization to access a portal such as access to an account or to an information source), and an ID management system 190 (which may store, verify, and/or update credentials made accessible to other devices in system 100). The components of the system 100 may be communicably and operatively coupled to each other directly or over a network that permits the direct or indirect exchange of data, values, instructions, messages, and the like (represented by double-headed arrows in FIG. 1).

Each system and device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise by sending and receiving transmissions. The various components of devices in system 100 may be implemented via hardware (e.g., circuitry), software (e.g., executable code), or any combination thereof. Each system and device in system 100 may moreover include a security client which may provide fraud prevention measures and security protections (such as generation of security tokens, authentication of devices, verification of biometric or other security data, etc.).

The systems and devices in system 100 may also include application programming interface (API) gateways to allow the systems and devices to engage with each other via various APIs, such as APIs that facilitate authentication, data retrieval, etc. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), accounts, dates, functionalities, tasks, etc. In system 100, a system or device may provide various functionality to other systems and devices through APIs by accepting API calls via an API gateway. The API calls may be generated via an API engine of a system or device to, for example, make a request from another system or device.

The credential management system 110 may include an onboarding unit 112 for registering and/or establishing, for example, ID issuers (via, e.g., ID issuer systems 130) or other entities validating identity attributes, users (via, e.g., user devices 150), and requesting entities such as smart devices or service providers (via, e.g., receiver devices 170). In certain implementations, in the case of an ID issuer, for example, onboarding unit 112 may onboard an ID issuer (e.g., a public or private entity, such as an organization or individual) via a network provider (a steward) to become an entity that can validate identity attributes in the generation of credentials. In some implementations, the ID issuer may generate a unique digital ID that serves to identify a relationship between the ID issuer, network operator, and the credential management system. The network operator may use the digital ID and execute NYM commands to register the ID issuer.

A credential generator 114 may generate credentials which could be made usable or otherwise accessible via an identity wallet (e.g., ID wallet 166 and ID wallet 192, which in certain implementations may include duplicates of digital credentials in as backups). In various implementations, generation of digital credentials may comprise generation of cryptographic keys and/or unique identifiers for ID issuers, users, identity attributes, identity data elements, validation status, etc. Generation of a digital credential for an identity attribute may comprise validating an identity attribute with an ID issuer. Ledger manager 116 may record validation of identity attributes and/or digital credentials in various forms in a distributed ledger. The distributed ledger may be accessed to, for example, verify that a particular identity attribute for a particular user has been validated by a particular ID issuer as of a particular date and time. Blockchain technology may be used in combination with other security measures. Data on users, ID issuers, requesting entities such as service providers or smart devices, digital credentials, etc., may be stored and made accessible at ID/user database 118.

ID issuer systems 130 may be associated with trusted entities such as governmental bodies, financial institutions, utility companies, individuals, or other entities which are highly incentivized to inspire trust, prevent theft or other fraud, and/or maintain verified user data useful for authentication, security, and preservation of the entity's relationships with users. ID issuer system 130 may include a validation unit 132 that accepts requests (from, e.g., credential management system 110 and/or user devices 150) to validate (attest, endorse, or certify) identity attributes for particular users. In various embodiments, such as implementations in which a trusted entity is an individual, an identity attribute may indicate, for example, existence of a certain association (e.g., a business relationship) and/or a certain authorization to, for example, operate a device (such as the individual's vehicle or home appliance), enter a facility (such as the individual's home or office), access an account or database of the individual (such as accessing a person's financial or social media account or other information source through a portal), etc. The validation unit 132 may authenticate a request (by, e.g., verifying the sender and the data in the request) and validate the identity attribute. A schema manager 134 may generate and maintain a schema identifying which identity attributes will be validated by the ID issuer system 130 and/or which ID attributes may be included in a digital credential. Data on users, identity attributes, digital credentials, schema, etc., may be stored and made accessible at ID/user database 136. The ID issuer system 130 may, additionally or alternatively, include components depicted as part of other systems or devices in FIG. 1. For example, ID issuer system 130 may include a credential generator and/or ledger manager that may be involved in, for example, issuing and managing digital credentials.

User devices 150 may include one or more user interfaces 152. Input/output (I/O) components may allow a user to provide inputs (e.g., a touchscreen, stylus, force sensor for sensing pressure on a display screen, etc.) and provide perceptible outputs (e.g., displays and light sources for visually-perceptible elements, a speaker for audible elements, and haptics for perceptible signaling via touch). Biometric sensors 156 may include a fingerprint reader, a heart monitor that detects cardiovascular signals, an iris scanner, a face scanner, and so forth. Ambient sensors 158 detect surrounding conditions, such as ambient sights and sounds, and may include cameras, imagers, or other light detectors, and microphones or other sound detectors.

User devices 150 may include wireless interfaces 160 for wireless communications via one or more communications protocols. For example, wireless interfaces 160 may enable near-field communication (NFC) between two devices located close to each other (e.g., within four centimeters of each other). Wireless interfaces 160 may include other protocols such as Bluetooth, Wi-Fi, and/or wireless broadband. One or more user devices 150 may include one or more location sensors 162 to enable the user device 150 to determine its location and/or orientation relative to, for example, other physical objects or relative to geographic locations. Example location sensors 136 include global positioning system (GPS) devices and other navigation and geolocation devices, digital compasses, gyroscopes and other orientation sensors, as well as proximity sensors or other sensors that allow the user device 150 to detect the presence and relative distance of nearby objects and devices. The user devices 150 may include various applications, such as ID management application 164 that provides access to an ID wallet 166 with credentials that are locally stored and/or stored remotely (at, e.g., ID wallet 192 of ID management system 190). In various embodiments, the digital credentials in ID wallet 166 and ID wallet 192 may be populated, updated, and otherwise managed via, for example, credential management system 110, ID issuer system 130, user devices 150, and/or ID management system 190. The user devices 150 may also include one or more applications 168, which may be applications that provide access to or control over other devices, access to accounts or portals, or to various functionality and features. Example client applications include internet browsers, applications accompanying smart devices such as security systems, appliances, vehicles, etc., mobile banking applications, etc.

Receiver devices 170 may be devices associated with any entity, such as a computing device (e.g., a smart device), an individual, a merchant, a governmental body, a financial institution, etc., requesting proof of an identity attribute or otherwise requesting a digital credential. Example entities include portals (e.g., accounts or databases), governmental bodies, healthcare providers, financial institutions, merchants, social networking service providers, and/or smart devices (such as, e.g., smart vehicles, Internet of Things (IoT) devices, and security systems or gateways such as smart locks on doors or buildings). Receiver devices 170 (which may comprise and/or be part of smart devices) may include a credential query client 172 configured to generate a request for a digital credential or for a validated identity attribute. In various embodiments, the request may be provisioned to user devices 150 by, for example, direct transmission to the user devices 150 (via, e.g., NFC or other communication protocols), transmission to user devices 150 via a network such as the Internet, and/or visual presentation, such as a code (e.g., a QR code) or description displayed on a display screen of receiver devices 170 for scanning by the user device 150.

Receiver devices 170 may include wireless interfaces 180 for communications via one or more communications protocols, such as NFC, Bluetooth, Wi-Fi, wireless broadband, etc. Receiver devices 170 may include an application layer 182 through which users may deliver commands to, for example, smart devices capable of performing various functionality in response to the commands. The receiver devices 170 may also include smart components 184, such as the hardware and software used for smart device functions, such as, for example, operation of motors, engines, locking and unlocking mechanisms, audiovisual input/output devices, etc. Receiver devices 170 may be smart devices or a component thereof, or may be a separate device through which access or functionality may be authorized/de-authorized or enabled/disabled.

Once a digital credential is received by receiver device 170 (e.g., received by ID management application 176 from a user device 150 or ID management system 190), a credential verifier 174 may verify the digital credential. Credential verifier 174 may, for example, communicate with credential management system 110, ID issuer system 130, and/or ID management system 190 (e.g., by making one or more API calls, which may be accompanied by the digital credential to be verified) to confirm that the digital credential is authentic. Additionally or alternatively, in various embodiments the credential verifier 174 may confirm the authenticity of the digital credential by, for example, accessing a blockchain-based distributed ledger and determining whether the distributed ledger includes, references, or otherwise corroborates the digital credential and/or the identity attribute.

In various embodiments, requests may be input, generated, and/or transmitted via an ID management application 176 running on the receiver device 170. The credential query client 172 and/or the credential verifier 174 may also be components of ID management application 176., ID/user database 178 may be maintained locally by ID management application 176 and/or may be maintained remotely and accessed via ID management application 176.

To add a new digital credential to ID wallet 166 and/or ID wallet 192, a user may request the new digital credential, or may be offered the new digital credential. The user device 150 may receive a request for a new digital credential from a user. The request may be received as, for example, an input entered into a graphical user interface (GUI) of ID management application 164 via an I/O component 154 of user device 150. The request for the new digital credential may identify a corresponding identity attribute or set of identity attributes, such as the set of identity attributes found on a driver's license. The request may be submitted to ID issuer system 130 (of, e.g., the Department of Motor Vehicles), credential management system 110, and/or ID management system 190. In some implementations, ID issuer 130 may, directly or indirectly via credential management system 110 and/or ID management system 190, offer the user a new digital credential for one or more particular identity attributes. The offer may be, for example, displayed and accepted or rejected via ID management application 164. Once the new digital credential has been requested or the offer for the new digital credential accepted, the new digital credential can be provided by ID issuer system 130 and/or credential management system 110 and added to ID wallet 166 and/or ID wallet 192.

Figure 2:
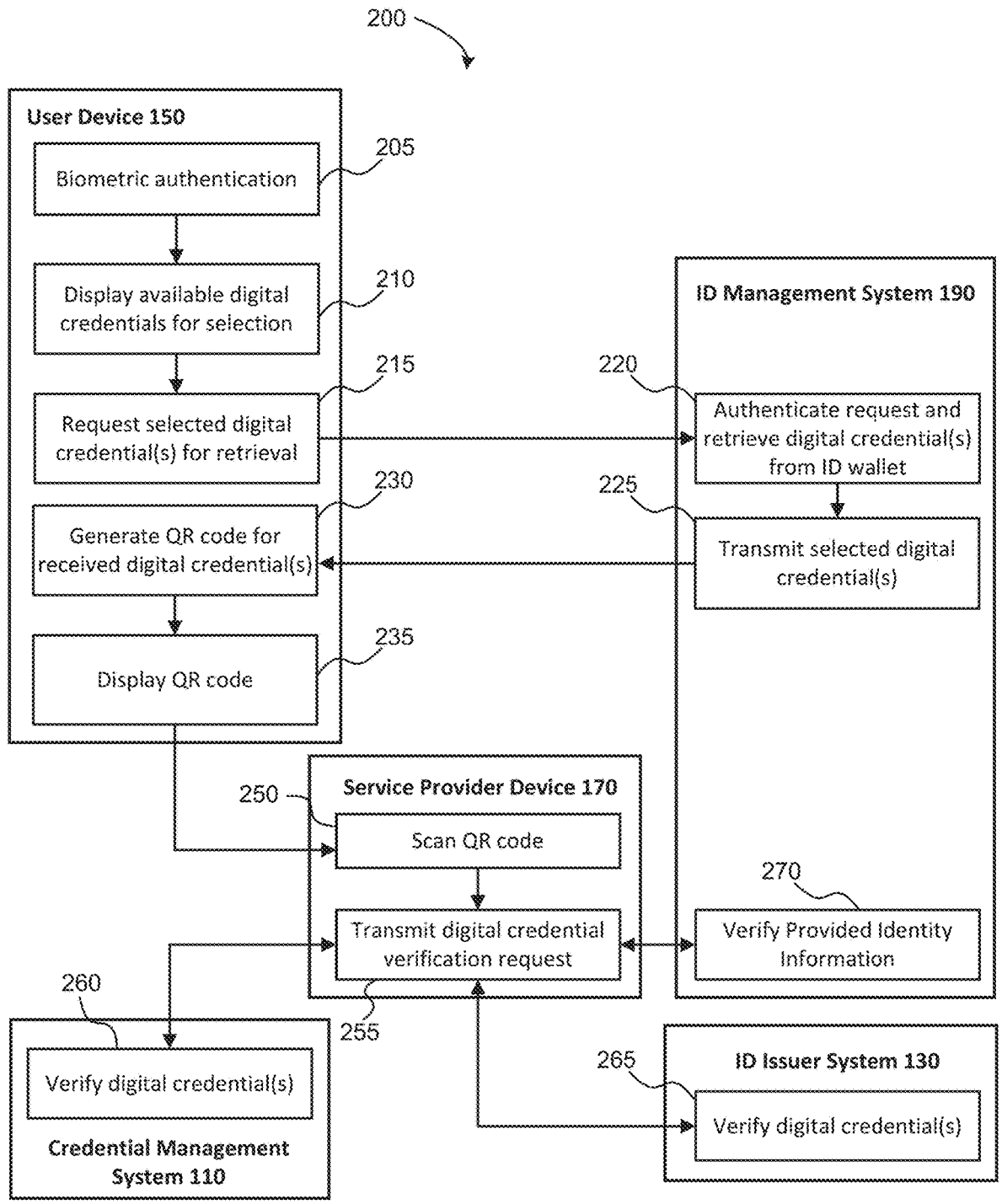
FIG. 2 is a flow diagram of an example process for provisioning digital credentials, according to example embodiments.

FIG. 2 shows a representation of a process 200 in which a user device 150 initiates a transaction that requires presentation of identity data with a receiver device 170. The transaction may be initiated via, for example, ID management application 164 running on the user device 150. In various embodiments, the ID management application 164 may be launched (via, e.g., the operating system of the user device 150) as a result of a user input (via, e.g., an I/O component 154) at a home screen of the user device 150. In potential embodiments, the ID management application 164 may launch, initialize, and/or display a prompt or otherwise present an alert upon detection (e.g., via wireless interfaces 160 and/or location sensors 162) that the user device 150 is near a requesting entity and/or a receiver device 170 (e.g., a merchant's place of business or a smart device such as a smart vehicle or security system). The user may then use the ID management application 164 to transact with the receiver device 170.

Once ID management application 164 has been launched, the user device 150 may display a prompt (via, e.g., a first GUI displayed on a display screen) for biometric authentication of the user, and the user may be biometrically authenticated via biometric sensors 156 (step 205). Digital credentials available in ID wallet 166 and/or ID wallet 192, and/or the identity attributes corresponding to the available digital credentials, may be displayed (e.g., as part of a second GUI) or otherwise presented by ID management application 164 (via user interfaces 152) for selection (step 210). One or more digital credentials and/or identity attributes may then be selected via user interfaces 152. If the digital credentials are not available in ID wallet 166, the ID management application 164 may transmit a request (e.g., via wireless interfaces 160) to ID management system 190 (step 215), which may then authenticate the request and retrieve the requested digital credentials from ID wallet 192 (step 220). The ID management system 190 may then transmit the retrieved digital credentials to the user device 150 (step 225). In certain embodiments, the digital credentials may, alternatively or additionally, be retrieved (by user device 150 and/or ID management system 190) from credential management system 110.

The digital credential may then be provisioned via, for example, wireless communication and/or visually-perceptible display. For example, ID management application 164 may generate a QR code (step 230) and display the QR code on a display device of the user device 150 (step 235). The receiver device 170 may then scan the provided QR code (step 250) and verify the digital credential by transmitting a verification request (step 255) to credential management system 110, ID issuer system 130, and/or ID management system 190. Once the digital credential(s) have been verified (steps 260, 265, and/or 270), the user device 150 and the receiver device 170 may proceed with the transaction. Digital credentials may be verified via credential verifier 174. Verification of digital credentials may comprise, in various embodiments: authenticating cryptographic keys and/or unique identifiers; confirming associations between users, identity data, and/or ID issuers; referencing a distributed ledger; and/or corroborating the identity data by referencing another available data resource (e.g., online databases, financial data, records of prior dealings, etc.).

In various potential embodiments the QR (or other) code generated by the ID management application 164 may contain identity attributes or other identity data associated with the user, such that a receiver device 170 may access the identity data upon scanning of the QR code. Additionally or alternatively, the QR code generated by the ID management application 164 may include service endpoints relating to the selected identity data and/or attributes, such that a receiver device 170 may access the service endpoints upon scanning the QR code. A service endpoint may be, for example, a uniform resource locator (URL) associated with a particular digital credential that points to a particular ID issuer system 130 or records related to the validation of the identity attributes corresponding to the digital credentials. The service endpoints provided to the receiver device 170 by the user device 150, via the generated QR code, may cause the receiver device 170 to communicate with, for example, the credential management system 110, the ID issuer system 130, and/or the ID management system 190 to gain access to the requested identity data or to information on the validation thereof.

In various embodiments, the information included in a QR code generated by, for example, the user device 150 may be available indefinitely after being scanned by the receiver device 170. In certain embodiments, the information included in the QR code may expire a predetermined period of time after the receiver device 170 scans the QR code. Expiration may be implemented, for example, via a cryptographic key that is only valid for a certain time, through denial of access, by recording an expiration in a distributed ledger, or otherwise. In potential embodiments in which the QR code contains identity data, the expiration may be presented using a countdown timer (counting down from, e.g., 30 seconds or five minutes) displayed along with the identity data on the receiver device 170. Where the QR code contains service endpoints associated with identity data, the service endpoints may become inaccessible after a period of time after the QR code has been scanned by the receiver device 170.

In various embodiments, the receiver device 170 may initiate a transaction with a user device 150 (rather than the user device 150 initiating the transaction with the receiver device 170). The receiver device 170 may generate, for example, a QR code (via, e.g., credential query client 172) that identifies one or more requested identity attributes, and display the QR code on a display screen. Via ID management application 164, the QR code can be scanned by user device 150 using an ambient sensor 158 (e.g., a camera or other light detector) of the user device 150. The ID management application 164 may then biometrically authenticate the user via one or more biometric sensors 156. The ID management application 164 may decipher the QR code to identify the requested identity attribute(s). The ID management application 164 may determine whether any digital credentials accessible via ID wallet 166 and/or ID wallet 192 are suited to proving the identity attribute(s). The ID management application 164 may display or otherwise identify (via one or more I/O components 154) the requested identity data, and/or may display or otherwise identify suitable digital credentials available in ID wallet 166 and/or ID wallet 192. The user may then select desired digital credentials and/or confirm that the digital credentials may be provisioned to the receiver device 170.

Figure 3:
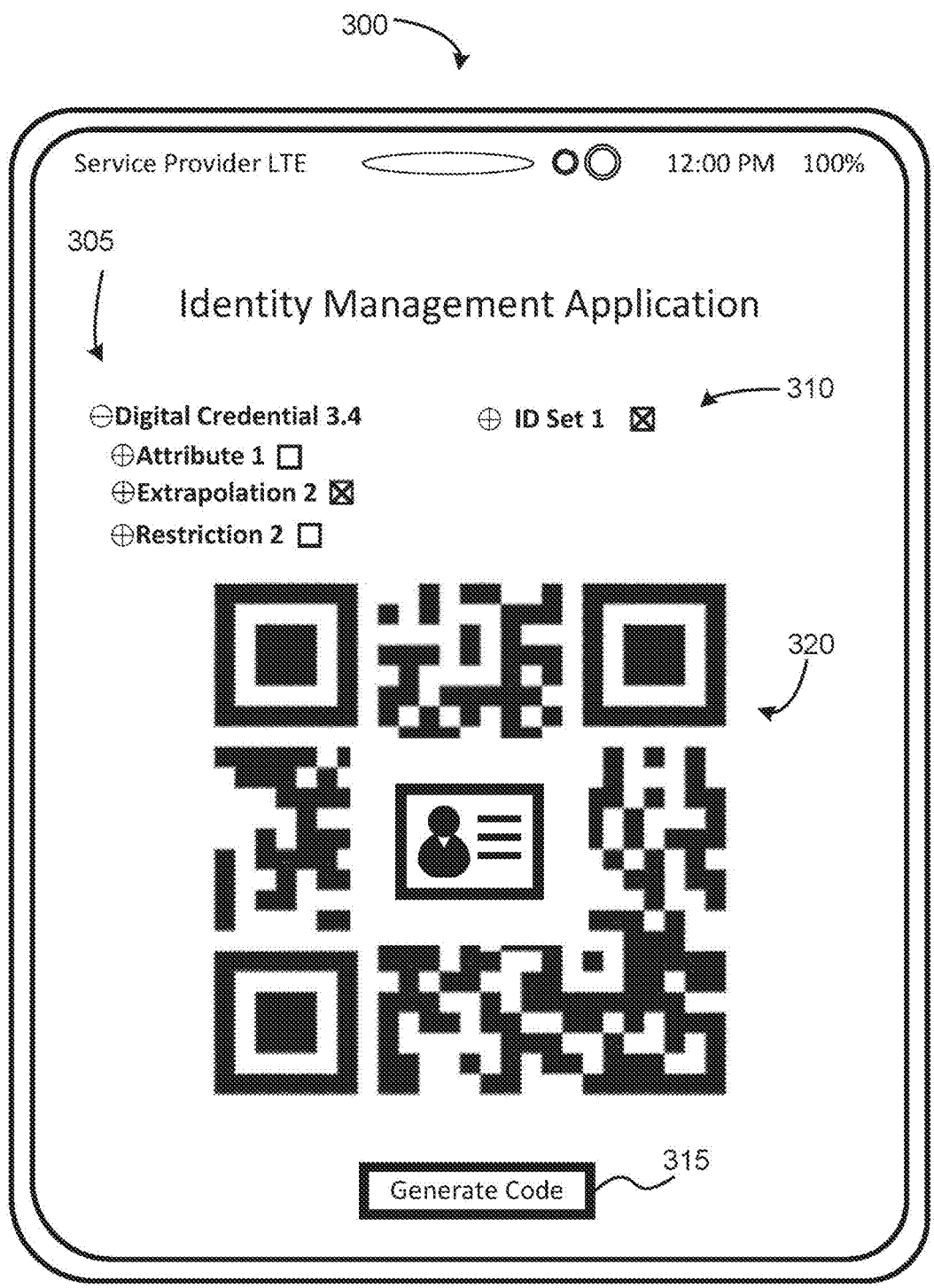
FIG. 3 depicts an example user interface for provisioning a digital credential via display of a machine-readable code, according to example embodiments.

The ID management application 164 may retrieve selected digital credentials from ID wallet 166 and/or ID wallet 192, and one or more QR codes (with, e.g., identity data or pointers thereto) generated and displayed for scanning and verification (via, e.g., credential verifier 174) by the receiver device 170 (at least in certain implementations in which provisioning involves display of codes). Referring to FIG. 3, which shows an example GUI 300 displayed on user device 150 according to potential embodiments, the ID management application 164 may (at 305) identify the identity attributes corresponding to available digital credentials suited to the request of the receiver device 170. In some embodiments, the identity attributes may be identified as a set (e.g., "ID Set 1" in FIG. 3), and the entire set (or a subset of identity attributes therein) may be selected (as indicated by the "x" at 310). The GUI 300 also includes a generate code icon 315 which, when selected (e.g., by touching the corresponding area of the touchscreen), may generate and display QR code 320 for the selected digital credentials and/or selected identity attributes.

Figure 4:
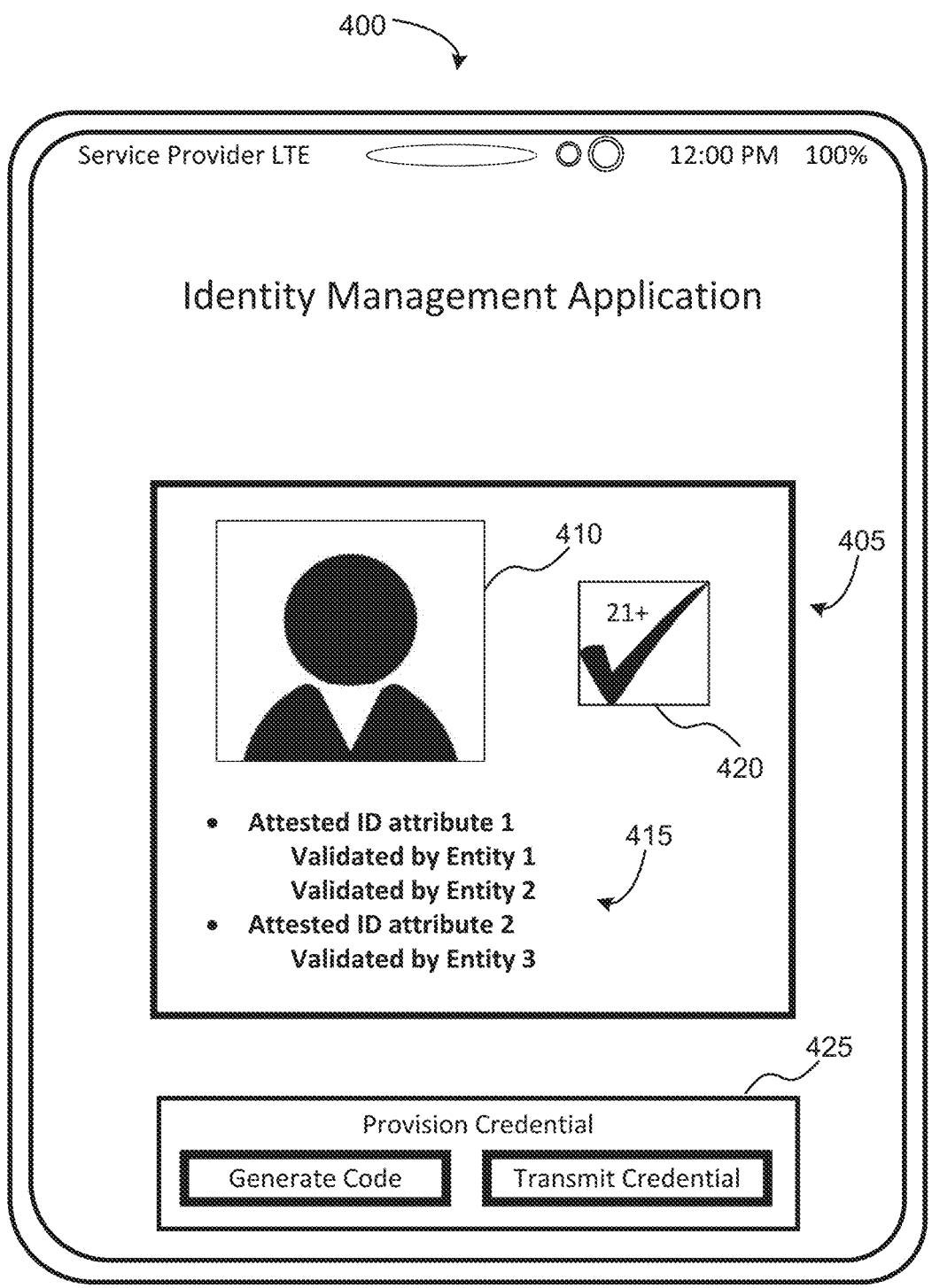
FIG. 4 depicts an example user interface for presentation of identity attributes, according to example embodiments.

Referring to FIG. 4, ID management application 164 may additionally or alternatively display one or more validated identity attributes corresponding with one or more available digital credentials, in various potential embodiments. GUI 400 includes (at region 405) an image 410 of the user whose identity attributes are to be proved. The service provider or other requesting entity may view or analyze the image 410 and compare it with the user holding the user device 150. In some embodiments, the receiver device 170 may scan the image 410 as well as the face of the user holding the user device 150 (using, e.g., an imager of the receiver device 170), and the two images analyzed (using, e.g., facial recognition) and compared with each other to confirm they are the same person, or determine that the likelihood that they are the same persons exceeds a certain predetermined threshold (e.g., at least 90 percent likelihood).

GUI 400 may also include (at region 415) a listing of the identity attributes which have been validated by digital certificates in the user's ID wallets. In some embodiments, multiple attributes, with any one attribute validated by one trusted entity or more than one trusted entity, may be presented. In some embodiments, the identity attribute requested an extrapolation that requires a true or false (e.g., yes or no) response to a question, such as: "Is the user at least 21?" or "Is the user under 18?" (based on, e.g., the user's birthdate and the current date); "Is the user licensed to operate [a commercial vehicle][a forklift][a motorcycle][a certain machine]?" (based on, e.g., a valid license and a determination that the license is unexpired or otherwise valid); "Is the user a property owner?" (based on, e.g., a title or deed and a determination that it has been properly recorded or executed or is otherwise deemed valid); etc. Other sample questions include whether the user is a member of a certain club, is a resident of a particular apartment building, is related to or associated with someone with a particular status, and so forth.

In some embodiments, a digital credential or extrapolation may be conditional, such as "User is authorized to enter premises if [wearing safety goggles or other safety gear like a helmet, suitable footwear, etc.]," which can be determined via, for example, a receiver device 170 scanning the user, or "User is authorized to proceed if user [performs a certain action or passes a test, such as speaking a phrase (for confirmation of knowledge of the phrase, for voice recognition, and/or for speech analysis to evaluate, e.g., a mental state, health condition, sobriety, etc.), removing jewelry, leaving behind all metallic items, etc.]. In certain embodiments, a digital credential or extrapolation may be conditional on an action or presence of another user, such as being accompanied by a parent or adult. In such cases, the presence or action of another user may be determined by a first user device 150 of a first user (and/or a receiver device 170) communicating with or detecting a second user device 150 of a second user (e.g., via NFC), or the first user device 150 photographing or otherwise scanning (using, e.g., ambient sensors 158) the first user's surroundings to determine that the second user is present and/or performing a certain action. In such cases, the first user device 150 may alternatively or additionally, like a receiver device 170, request a digital credential from the second user device 150 to confirm a certain requirement or relationship, such as the second user being a parent or otherwise related to the first user, or the second user being at least a minimum age. In various implementations, the presence or action of other users may, additionally or alternatively, be confirmed via one or more receiver devices 170.

In some examples, the receiver device 170 may be a vehicle or other smart device which is configured to require a digital credential from a user before allowing the user to start the vehicle or otherwise use or engage with the smart device. The vehicle as receiver device 170 may request a digital credential confirming, for example, that the user owns the vehicle is or a family member of or otherwise related to an owner and/or that the user is licensed to drive. In certain implementations, the digital credential may indicate that the user is conditionally authorized to drive the vehicle or use a smart device in certain circumstances. For example, the user may be required to demonstrate fitness to drive (e.g., by breathing into a breathalyzer to demonstrate that the user's blood alcohol content is below a maximum level) if, for example, a digital credential indicates that the user has been ordered by a judge or is otherwise required to demonstrate fitness to drive before the vehicle can be started. Similarly, if the license is a learner's permit, the smart vehicle may request a suitable digital credential from another user device 150 to, for example, demonstrate that an adult who is licensed is accompanying the driver. In some implementations, the requirement for digital credentials may be engaged (e.g., remotely) if a vehicle or other smart device is reported (or otherwise believed) to be lost or stolen.

In various embodiments, the receiver device 170 may be (or may be associated with) a smart lock device or mechanism that is configured to require a digital credential (to prove, e.g., identity and authorization from an owner or agent thereof) from a user before allowing the user to enter an area (e.g., a home, office building, warehouse, hotel room, etc.). In certain embodiments, the receiver device 170 is a computing device through which a user accesses a portal (e.g., mobile device used to access an application or website). For example, while accessing an application or website on a receiver device 170 that is a laptop or desktop computer, a user may present a digital credential via a user device 150 that is a smartphone. Similarly, while accessing an application or website on a receiver device 170 that is a smartphone, a user may present a digital credential via a user device 150 that is a wearable device such as a smart watch or smart clothing.

In some embodiments, a digital credential may be "intra-device," may be "cross-application," or may otherwise involve one device, such that the receiver device and the user device are the same device. For example, a first application (e.g., client application 168) running on a user device 150 may require proof of a digital attribute or request a digital credential from the user. A second application (e.g., ID management application 164) running on the user device 150 may provide a suitable digital credential. In various embodiments, the second application may present the digital credential to the first application (e.g., directly or via an operating system of the device), or to another system or device, such as a remote server via a network. In various implementations, the first application may be informed of the digital credential actively or passively, directly or indirectly. For example, the first application may await an indication from the other system or device, or an intermediary system or device, that the digital credential has been received and/or validated. Additionally or alternatively, the first application may itself confirm receipt of the digital credential by the other system or device by, for example, transmitting a request for confirmation (to the other system or device, or to an intermediary system or device) of a suitable digital credential and receiving confirmation (from the other system or device, or from the intermediary system or device) in response to the request.

Such ID attributes may themselves be validated by a trusted entity (e.g., an entity such as the DMV may provide the response such as "yes" or "no" to a specific question such as "is the user licensed to operate a motorcycle?"), or the identity attribute may be an extrapolation based on a validated identity attribute in combination with other known data. For example, the ID management application 164 may extrapolate, based on the user's birthdate in combination today's date, that the user is at least a minimum age. In certain embodiments, a separate, "secondary" digital credential may be generated (via, e.g., credential management system 110, ID management system 190, and/or ID management application 164) for an extrapolation which is not per se validated by a trusted entity but may be deduced or induced from validated or otherwise ascertainable data. The secondary digital credential may be based on a validated identity attribute of a "primary" digital credential.

At 420, GUI 400 indicates (as represented by the checkmark) that an identity attribute is confirmed and/or a condition is satisfied (e.g., the user is 21 years old or older, as indicated by the "21+"). Additionally, ID management application 164 may present, in various embodiments, a credential provisioning region 425 which provides selections to provision the digital credentials to the receiver device 170 via, for example, generation and display of a QR code ("Generate Code") or via a wireless transmission ("Transmit Credential") via NFC or otherwise.

FIGS. 5-12 show representations of example graphical user interfaces 500, 600, 700, 800, 900, 1000, 1100, and 1200 for ID management application 164 on user device 150 and/or for ID management application 176 on receiver device 170, according to example embodiments. The example user interfaces 500, 600, 700, 800, 900, 1000, 1100, and/or 1200 may be shown on a display screen of user device 150 to, for example, allow for selection of items to be provided to a receiver device 170, or on a display screen of receiver device 170 to, for example, allow for selection of items to be requested from a user device 150.

Figure 5:
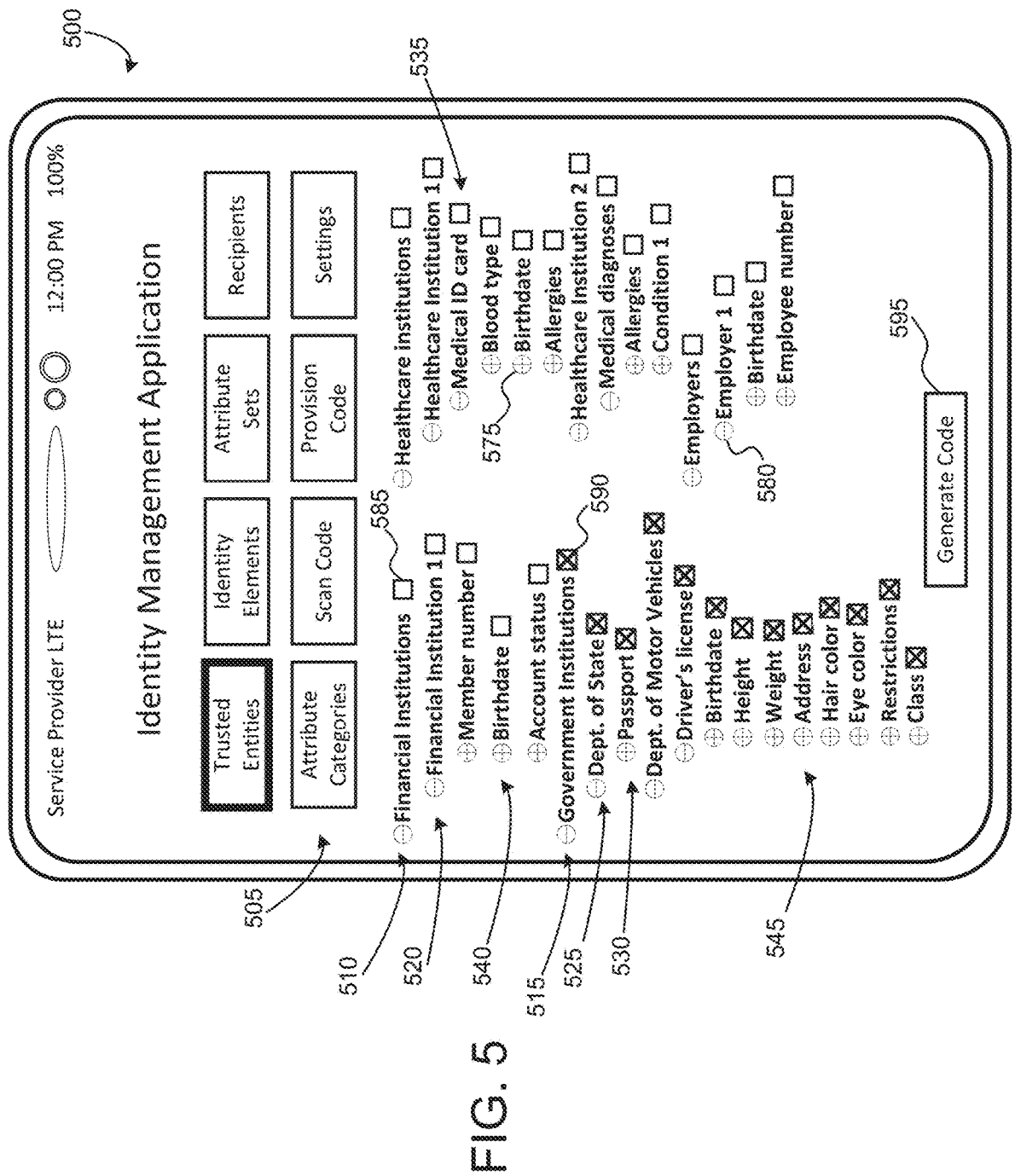
FIG. 5 depicts an example user interface for a trusted entities section of an identity management application, according to example embodiments.

The user interface 500 in FIG. 5 comprises one or more control categories 505, including "trusted entities," "identity elements," "attribute sets," "recipients," "attribute categories," "scan code," "provision code," and "settings." The bolded outline indicates selection of "trusted entities" among the control categories 505. While the "trusted entities" category is selected, entities that have and/or that may attest to or otherwise validate identity attributes pertaining to the user of user device 150 are listed by ID management application 164. Trusted entities may include ID issuers, governmental authorities, or other entities that may validate one or more identity attributes. A trusted entity (e.g., Healthcare Institution 1) may be selected using virtual buttons or other selectors, such as selectors 585 and 590, assigned to each item. Virtual buttons can be manipulated by, for example, a user touching, holding, pressing, etc. on a touchscreen or other I/O component 154. Selector 585, a square without an "x" therein, corresponds to items that have not been selected, while selector 590, a square with an "x" therein, corresponds to selected items. Repeated activation of a virtual button (e.g., by touching) results in selection and deselection of a corresponding item, causing an "x" to be added to an unselected item to indicate selection, and causing an "x" to be taken away from a selected item to indicate deselection.

Items displayed by user interface 500 may comprise one or more categories of trusted entities (e.g., financial institutions 510 and governmental institutions 515), particular trusted entities in each category (e.g., Financial Institution 1 520 and Department of State 525), attribute sets (e.g., passport 530 and medical ID card 535), identity attributes (e.g., member number, birthdate, blood type, allergies, and health conditions at, e.g., 540 and 545), etc. Certain items (e.g., account information and allergies) may include a list of one or more sub-items that are not currently being displayed (i.e., the list of sub-items is "collapsed"), which is indicated by icon 575, which is a circle with a plus sign ("+") indicating there are (or may be) additional sub-items not currently shown. Items with a list of one or more sub-items that are currently being displayed (i.e., the list of sub-items is "expanded") are indicated by icon 580, which is a circle with a minus sign ("–") indicating that sub-items are displayed but could be hidden from view. Selecting or otherwise activating icon 575 (e.g., by touching) may display ("expand") the list of corresponding sub-items, while selecting or otherwise activating icon 580 may hide ("collapse") the list of corresponding sub-items being displayed. In various potential embodiments, activation (e.g., by touching) of virtual buttons (e.g., 585 and 590) corresponding with items that include one or more sub-items may cause all sub-items to be simultaneously selected or deselected. Using virtual buttons 585 and 590, for example, a user may select the identity attributes to be shared with a receiver device 170. A generate code selector 595 (and/or other provisioning selectors) may be used to generate and display one or more QR codes with one or more digital credentials corresponding to the selected identity attributes (or provision in another selectable manner).

Figure 6:
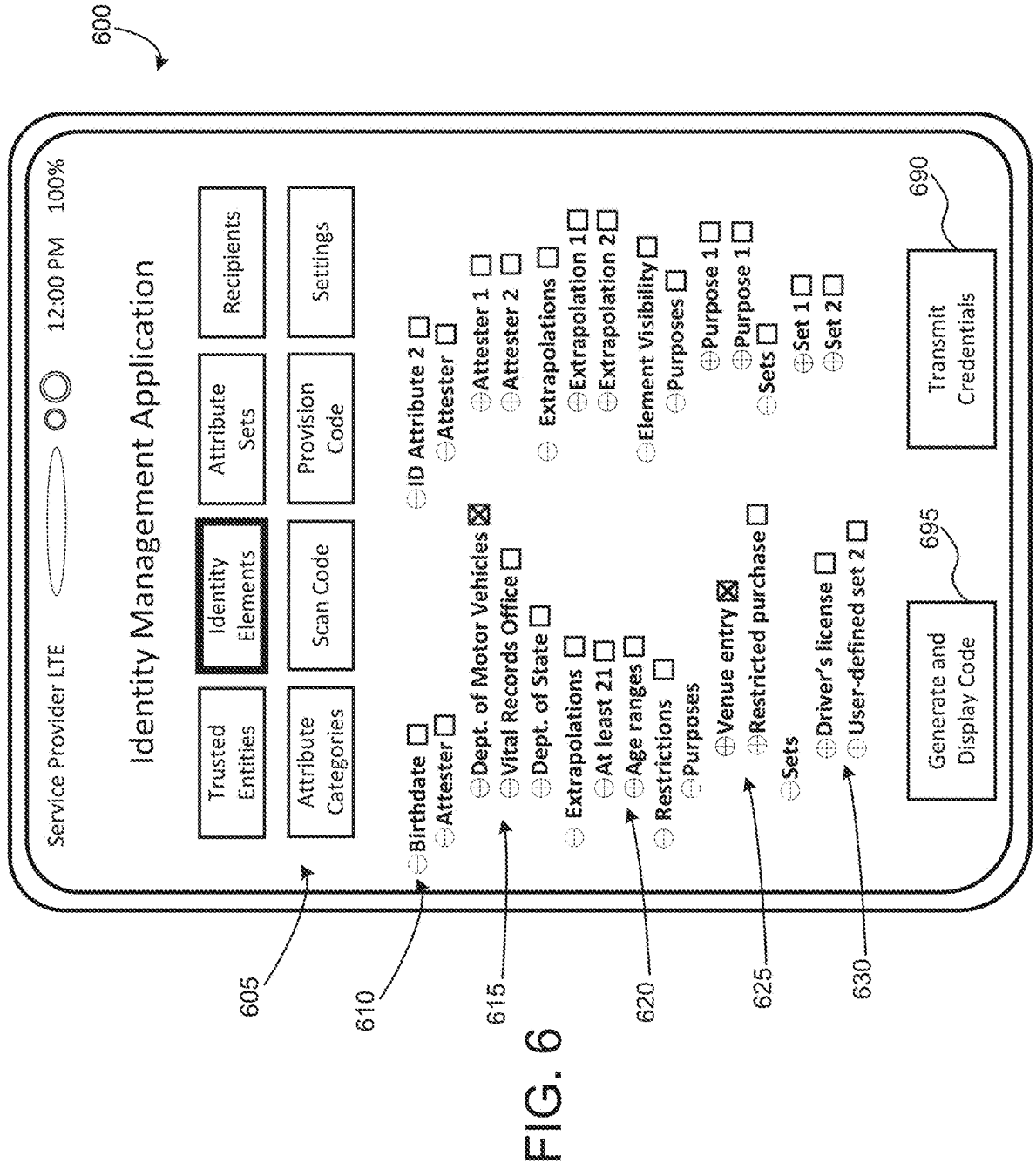
FIG. 6 depicts an example user interface for an identity attributes section of an identity management application, according to example embodiments.

In FIG. 6, "identity elements" has been selected at control categories 605 of user interface 600. Accordingly, individual identity attributes (e.g., birthdate 610) are at the highest levels. Because each identity attribute may be validated (attested to) by multiple trusted entities, identity attributes of particular attesters (e.g., trusted entities 615) are displayed and selectable. Extrapolations based on the identity attribute may also be selectable at 620, such as a minimum age, maximum age, or age range based on birthdate. Restrictions may be placed on identity attributes, such as purpose for which the identity attribute may be used. User interface 600 indicates at 625 that birthdate may be restricted to use for entry into an establishment or for making a particular purchase. Restrictions may limit, for example, a duration of time during which a code or identity attribute is displayed or displayable. The identity attribute may also be presented as part of a set. For example, birthdate may be presented as part of a set of identity attributes in a driver's license or a user-defined set at 630. Digital credentials corresponding to selected identity attributes with selected restrictions may be provisioned to a receiver device 170 via a transmit credentials selector 690 and/or a generate and display code selector 695.

Figure 7:
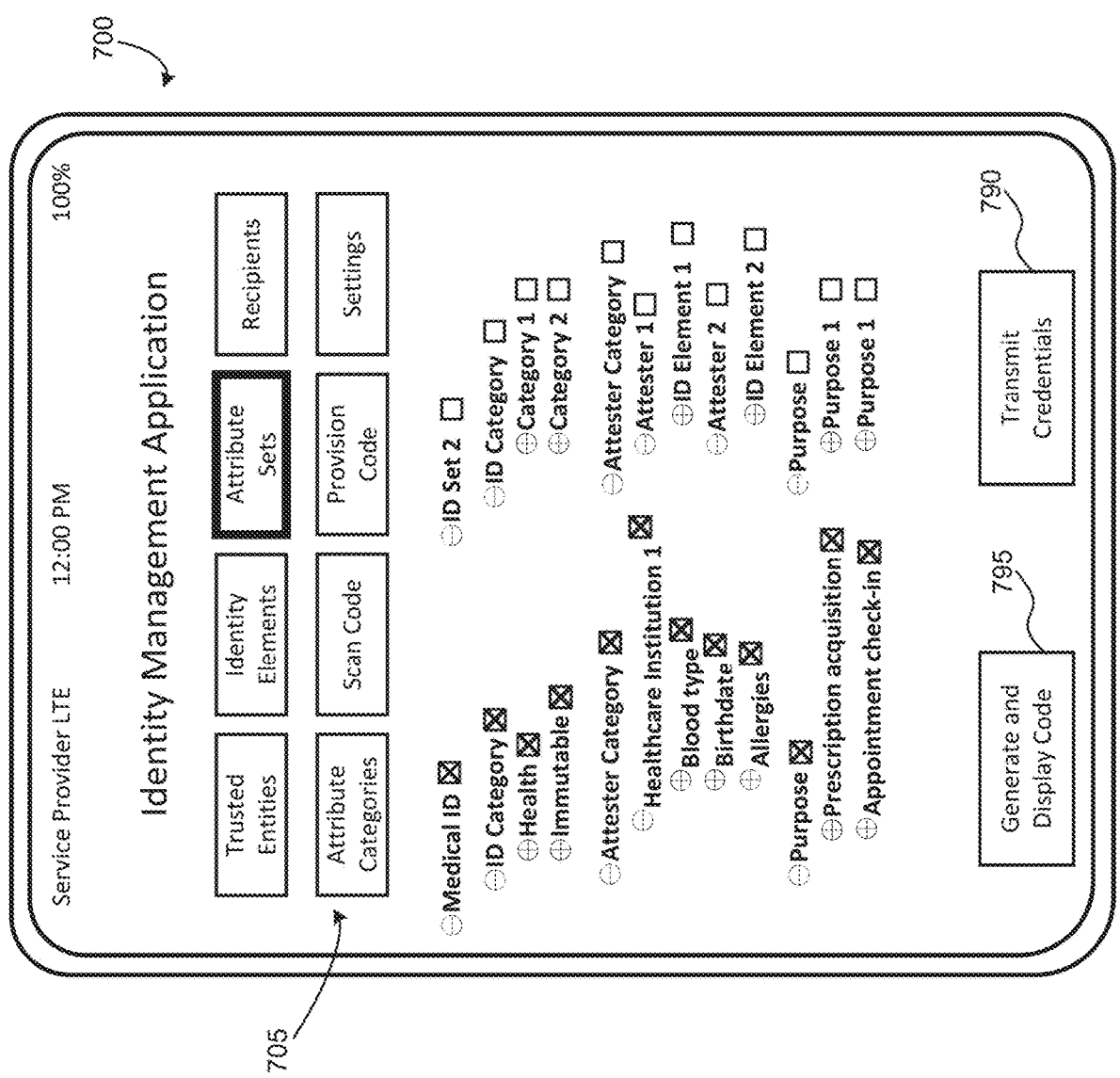
FIG. 7 depicts an example user interface for an identity attribute sets section of an identity management application, according to example embodiments.

In FIG. 7, "attribute sets" has been selected at control categories 705 of user interface 700. User interface 700 provides sets of identity attributes (e.g., the identity attributes associated with a medical ID or driver's license) at the highest level. Under each attribute set, a user may select subsets of identity attributes corresponding to various categories, such as identity attributes related to health (e.g., health conditions and blood type), identity attributes that are immutable (e.g., place of birth), and trusted entities that have attested to the identity attributes. User interface 700 also allows for the placement of restrictions on identity attributes, such as use for prescription acquisition or appointment check-in. Digital credentials corresponding to selected identity attributes with selected restrictions may be provisioned to a receiver device 170 via a transmit credentials selector 790 and/or a generate and display code selector 795.

Figure 8:
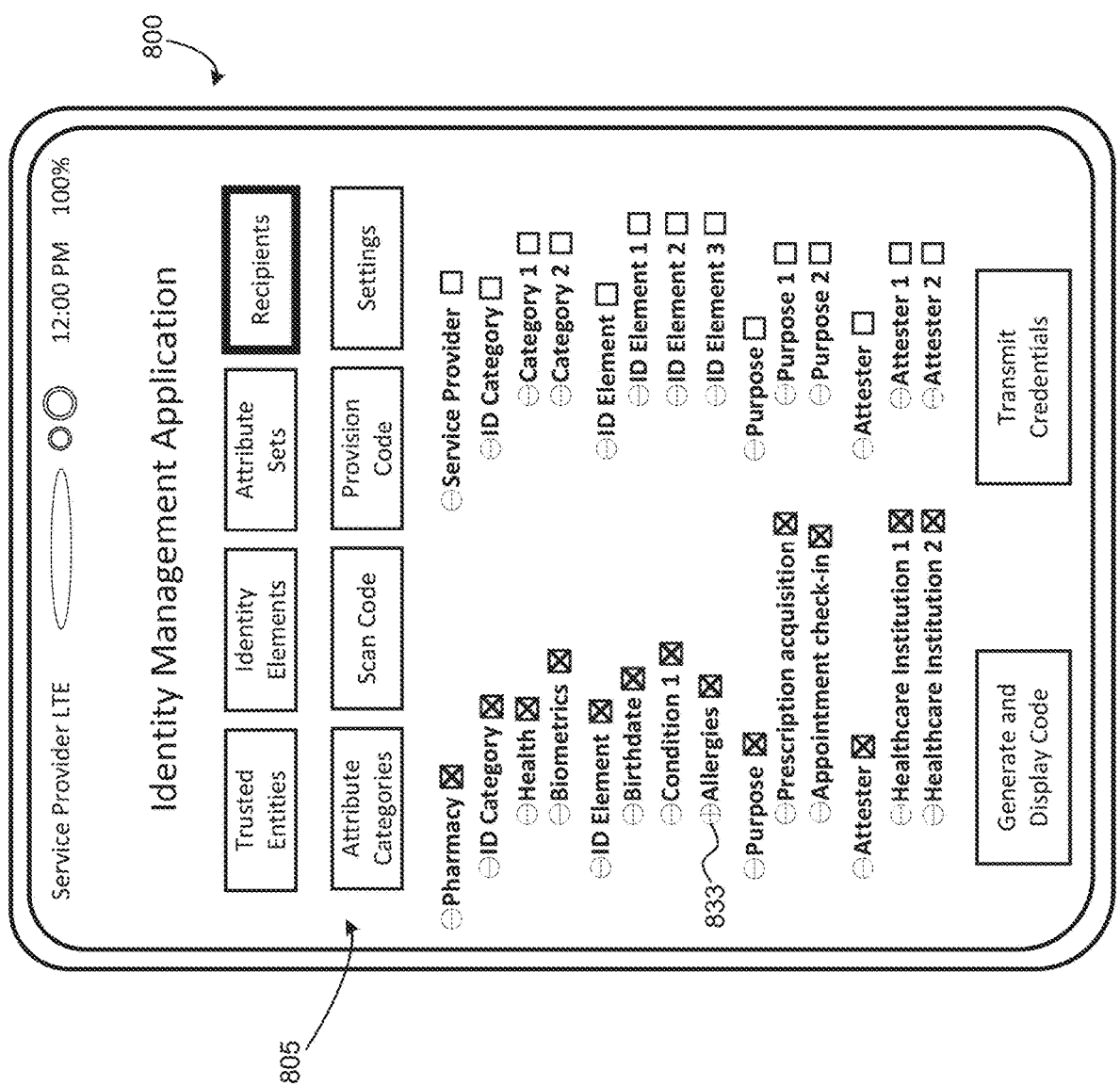
FIG. 8 depicts an example user interface for a digital credential recipients section of an identity management application, according to example embodiments.

In FIG. 8, "recipients" (of digital credentials) has been selected at control categories 805 of user interface 800. User interface 800 provides sets of requesting entities such as service providers that have been or may be recipients of digital credentials from the user at the highest level. Under each entity, a user may select subsets of identity attributes corresponding to various attribute categories (e.g., health) or trusted entities (attesters such as Healthcare Institution 1), as well as specific individual identity attributes (e.g., health condition or allergies). User interface 800 may allow a user to readily select identity attributes which have previously been provisioned to receiver devices 170 for provisioning again to the same receiver devices 170 or to other receiver devices 170.

Figure 9:
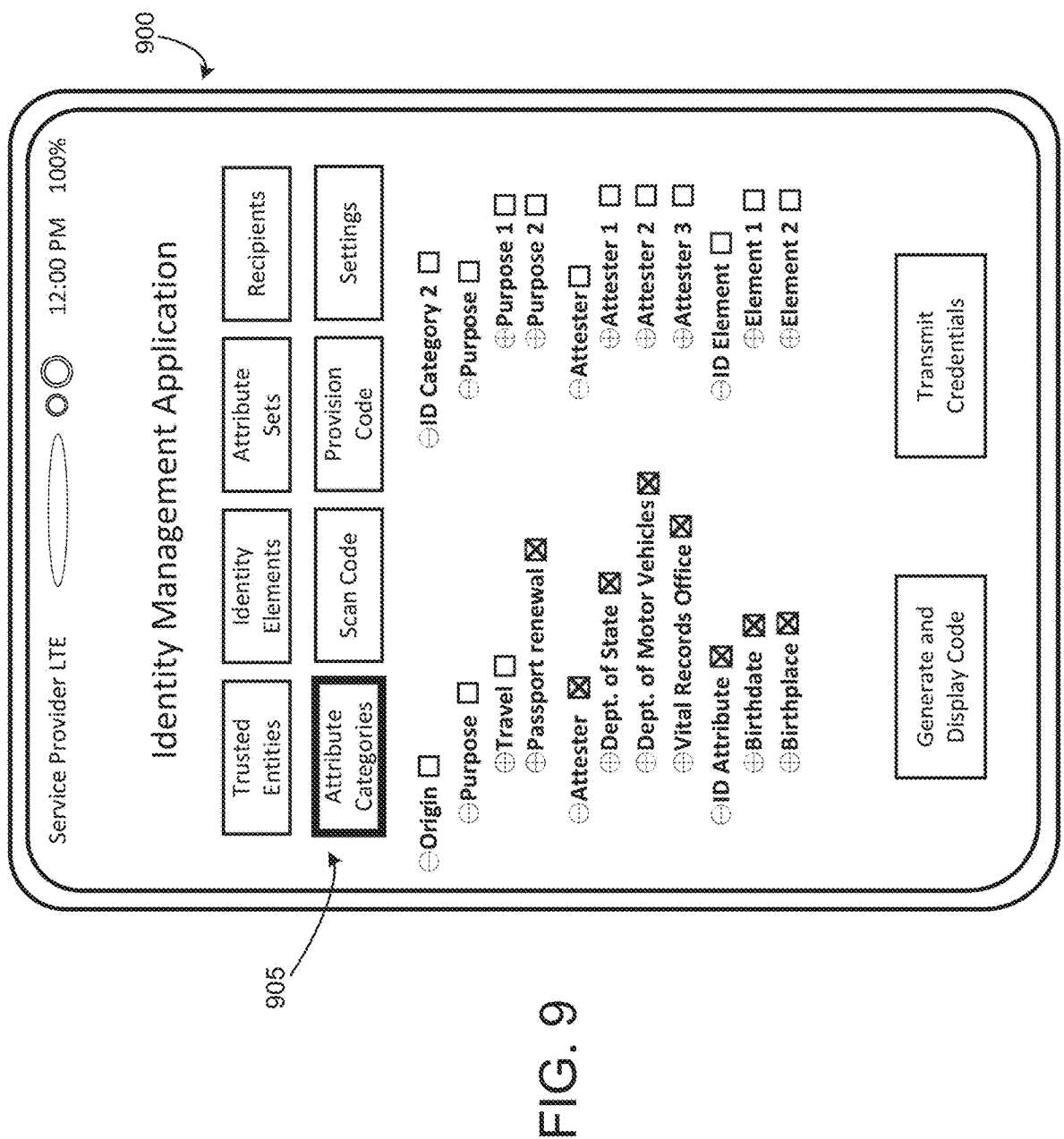
FIG. 9 depicts an example user interface for an attribute categories section of an identity management application, according to example embodiments.

In FIG. 9, "attribute categories" has been selected at control categories 905 of user interface 900. User interface 900 provides categories of identity attributes at the highest level. Under each attribute category, a user may select subsets of identity attributes corresponding to various attribute uses (e.g., passport renewal), trusted entities (attesters such as the Department of State), as well as specific individual identity attributes (e.g., birthdate and birthplace). User interface 900 allows a user to select related identity attributes for provisioning to a receiver device 170.

Figure 10:
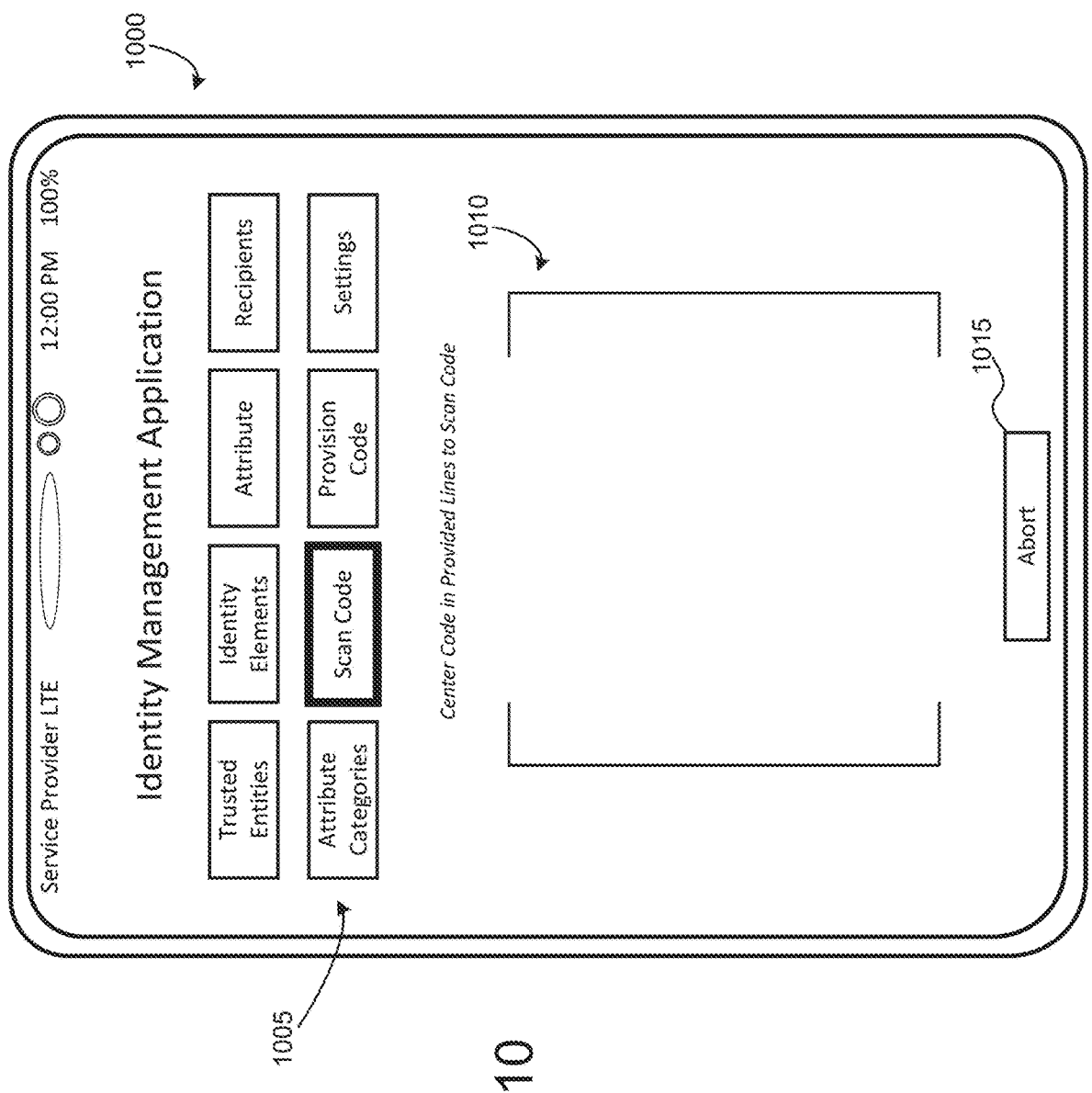
FIG. 10 depicts an example user interface for a scan code section of an identity management application, according to example embodiments.

In FIG. 10, "scan code" has been selected at control categories 1005, which causes display of a prompt for scanning a QR code displayed by, for example, a user device 150 or a receiver device 170. The QR code may include a request or description of one or more identity attributes, digital credentials, etc. The QR code can be scanned by the user device 150 or receiver device 170 using an ambient sensor such as a camera. Field 1010 shows a designated frame in which the QR code can be positioned (by, e.g., adjusting the position of the camera until the QR code is contained within field 1010) for automated scanning. The ID management application may itself decipher the QR code itself, or may transmit the QR code to a remote server for analysis and receive the results back from the remote server. ID management application 164 may determine which (if any) digital credential(s) available in an accessible ID wallet may satisfy the request. Analogously, ID management application 176 may determine whether digital credentials received correspond to requested identity attributes. Abort selector 1015 may be used to abort scanning a code and/or to exit user interface 1100.

In various potential embodiments, the provided QR code could instead be a barcode or other form of machine-readable label. In some potential embodiments, user interface 1000 may be automatically displayed based on user device 150's proximity to a receiver device 170 (determined, e.g., by ID management application using location sensors and/or wireless interfaces such as by receiving an NFC transmission between a receiver device 170 and user device 150). In such versions, the user interface 1000 may display a prompt asking whether the user authorizes or accepts a transmission from a nearby receiver device 170.

Figure 11:
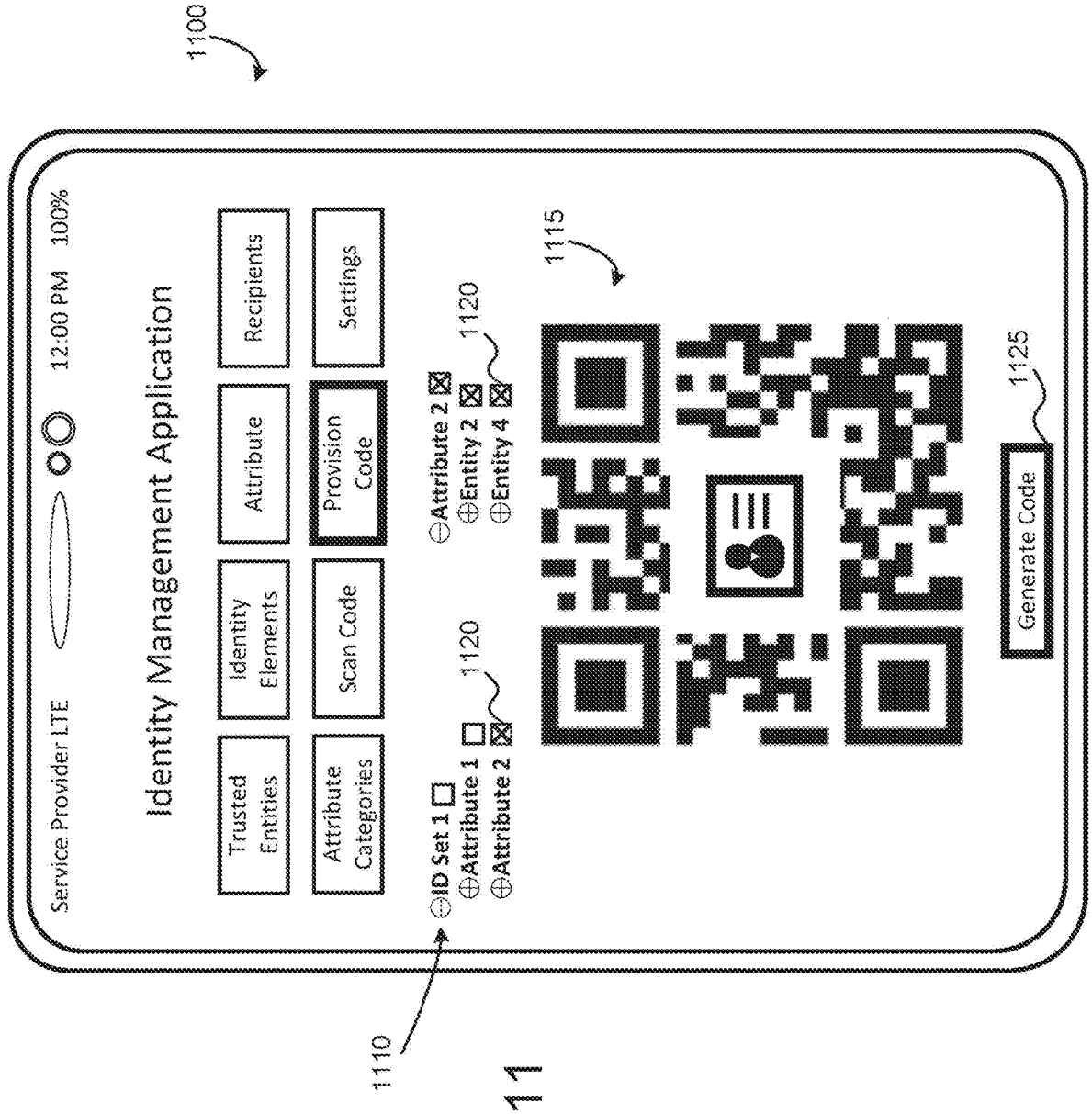
FIG. 11 depicts an example user interface for a provision code section of an identity management application, according to example embodiments.

In FIG. 11, "provision code" has been selected at control categories 1105, which causes display of a QR code for scanning by, for example, a receiver device 170 or a user device 150. Alternatively or additionally, the "provision code" screen could allow for other mechanisms for provisioning the code, such as direct wireless transmission to a receiver device 170 via NFC. The bolded outline at 1125 at the bottom of user interface 1100 indicates that generate code selector 1125 has been selected, causing display of QR code 1115 containing one or more digital credentials (or pointers thereto) and/or identity attributes (or pointers thereto). In potential embodiments, provisioning of the QR code 1115 may be prompted by a user after selection of various items at one or more of user interfaces 500, 600, 700, 800, and/or 900). User interface 1100 shows a representation of a QR code corresponding to a selected "ID Set 1" 1110, which includes Attributes 1 and 2. As indicated by selector 1120 (with the "x"), the QR code displayed includes a digital credential corresponding to Attribute 2. In some implementations, QR code 1115 can be dynamically regenerated, and the displayed QR code replaced by the regenerated QR code, to change what digital credential(s) are included therein based on what selections are made via corresponding selectors. For example, the selector adjacent to "ID Set 1" may be selected (causing an "x" to be added thereto) to include all attributes in the set, or deselected (causing the "x" to be removed therefrom) to unselect all attributes listed under "ID Set 1"; the selector adjacent to Attribute 1 may be selected to add the digital credential corresponding to Attribute 1 to a displayed QR code; and the selector 1120 adjacent to Attribute 2 may deselected to delete or otherwise remove the digital credential corresponding to Attribute 2 from a displayed QR code.

Figure 12:
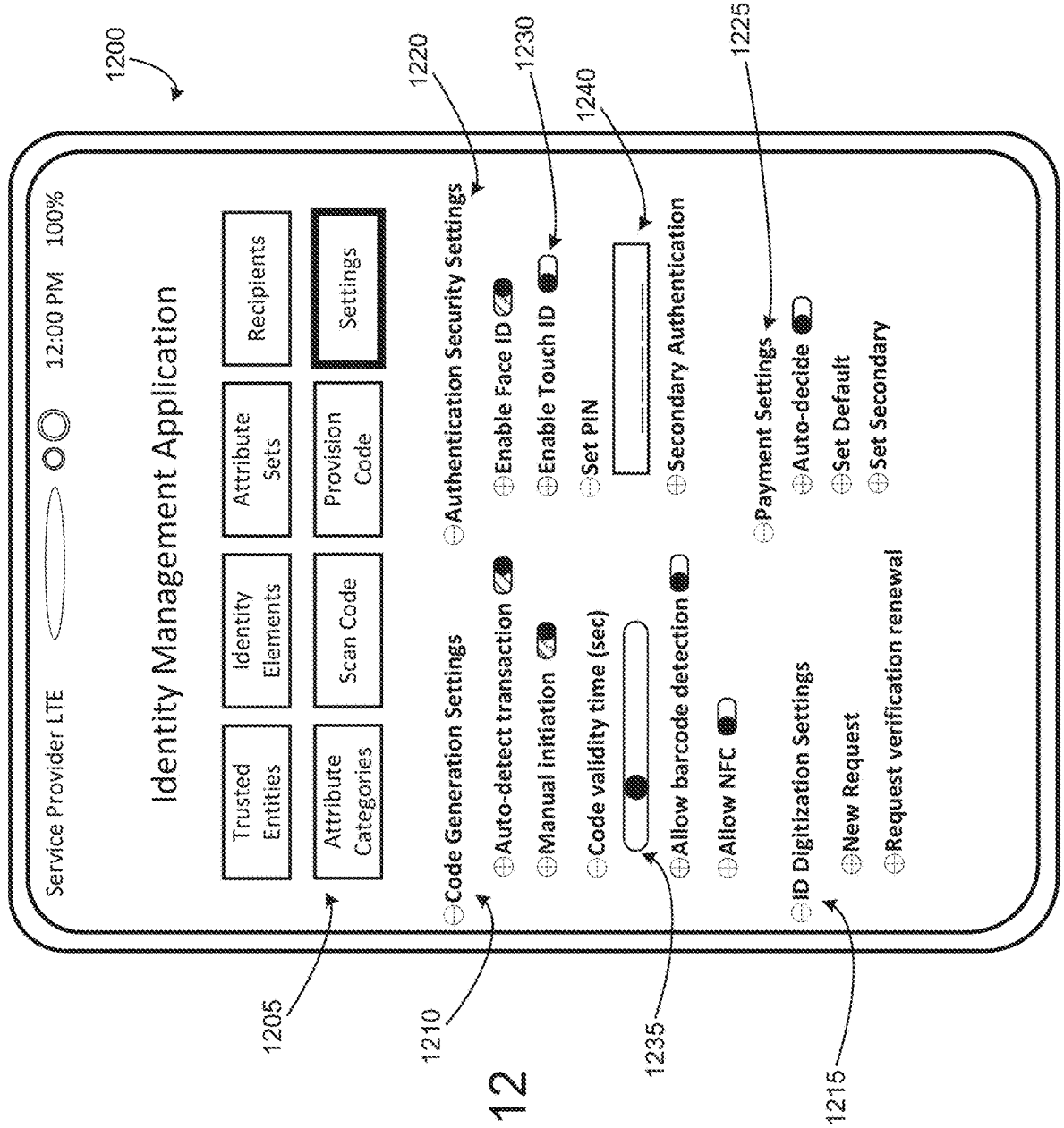
FIG. 12 depicts an example user interface for a settings section of an identity management application, according to example embodiments.

In FIG. 12, "settings" has been selected at control categories 1205, allowing for review and changing of settings of ID management application 164 or ID management application 176. Example settings include, but are not limited to, settings related to code generation 1210, ID digitization 1215, authentication security 1220, and payment 1225. Settings may be changed by, for example, toggling (such as by via toggle selector 1230, which may be touched to, e.g., turn a setting on, off, or partially on/off as indicated by whether the filled-in circle is positioned in an oval to the left, the right, or to one side with diagonal lines), swiping (such as via magnitude selector 1235 with a filled-in circle that may be touched and dragged to the left or right to decrease or increase a level or size of a corresponding setting), and/or text entry (such as entering an alphanumeric value into text field 1240). Code generation settings 1210 may include, for example, settings wherein the ID management application 164 may be toggled to automatically detect a transaction or interaction with a receiver device 170 and correspondingly generate a necessary QR code containing relevant digital credentials. In various potential embodiments, the automatic detection may be based on location of the user device 150 and/or the receiver device 170 and/or on concurrent use of the ID management application 164 on the user device 150 and use of the ID management application 176 on the receiver device 170. Other code generation settings may include a manual initiation setting, wherein a user can select a setting that prohibits automatic detection of transactions or interactions. In certain implementations, manual initiation may require a user to individually select, for example, one or more identity attributes. Additional settings may allow a user device 150 to allow barcode detection in addition to or in place of QR codes through the ID management application 164. In potential embodiments, a setting to allow NFC may be selected to enable close-range transactions and/or interactions with, for example, receiver devices 170.

In various potential embodiments, user interface 1200 may provide setting options pertaining to a user or user device 150 authentication security settings 1220. For example, ID management application 164 may be enabled to implement, for authentication purposes, facial recognition, fingerprint scan, touch inputs, a personal identification number (which may be entered into a text entry field underneath "set PIN"), and/or secondary types of authentication (such as challenge questions, email or text transmission of temporary codes, etc.). Payment settings 1225 may include an option for the ID management application 164 to automatically decide an appropriate payment method based on, for example, prior activity involving the user device 150. For example, the appropriate payment method may be determined from a list of user-provided payment methods, such as a linked credit and/or debit card, based on use of the payment method in the past with the same receiver device 170 or in similar circumstances.

Figure 13:
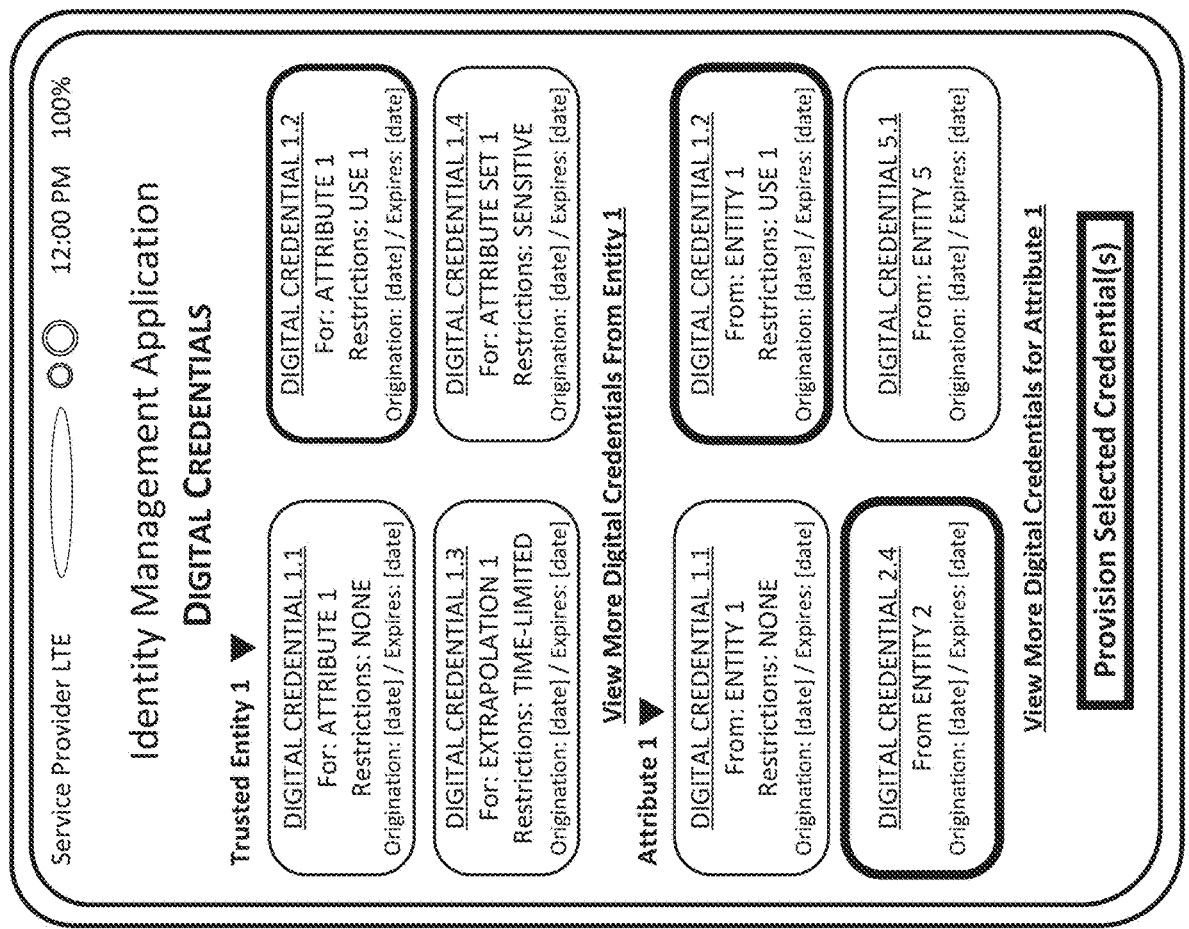
FIG. 13 depicts an example user interface for review and/or selection of digital credentials accessible via an identification wallet, according to example embodiments.

FIG. 13 shows a representation of an example user interface 1300 for ID management application 164 on user device 150 or ID management application 176 on receiver device 170, according to example embodiments. The user interface 1300 may be shown on a display screen of user device 150 or receiver device 170. In FIG. 13, ID management application may be displaying, at the top, a set of digital credentials that may be accessible via an ID wallet or that may have been received from one or more user devices 150. The digital credentials correspond to identity attributes validated by an identified ID issuer (in FIG. 13, "Trusted Entity 1" is the ID issuer for the displayed digital credentials). The triangle adjacent to "Trusted Entity" indicates a drop-down menu that allows for selection of other ID issuers (if any) through which digital credentials have been acquired. For Trusted Entity 1, four digital credentials are displayed. The digital credentials are identified by two numbers, first #.second #, where first #corresponds to the ID issuer (Trusted Entity 1), and second #("1," "2," "3," or "4") enumerates the digital credentials corresponding to the ID issuer. Two of the digital credentials (1.1 and 1.2) validate the same identity attribute (i.e., Attribute 1) but may have different restrictions (e.g., on how a digital credential may be used or for how long once provisioned) or expiration dates (e.g., how long a digital credential is valid and may be provisioned). For example digital credential 1.1 has no restrictions on the usability, while digital credential 1.2 is restricted to "Use 1" (e.g., for verifying a prescription). Digital credential 1.3 corresponds to Extrapolation 1 (e.g., minimum age), and the digital credential is time-limited (e.g., is only available for viewing for a certain time after being provisioned, such as 10 seconds, a minute, five minutes, an hour, or a day). In various implementations, tapping (e.g., touching with a finger and lifting the finger without delay) a digital credential selects the digital credential for provisioning, for example, upon selection of "provision selected credential(s)" icon at the bottom of user interface 1300. As indicated by the thicker borders of the digital credentials, Digital Credential 1.2 and Digital Credential 2.4 have been selected for provisioning (e.g., by touching to select and deselect) in user interface 1300.

In certain implementations, touching and holding (e.g., leaving a finger on a touchscreen for 1, 2, or 3 seconds without swiping) a digital credential presents (e.g., as a pop-up display on the present page or by navigation to another page) additional details on the digital credential or provides additional functionality such as hiding or deleting the digital credential. In some implementations, selecting and dragging (e.g., swiping) allow for rearrangement of the digital credentials so as to adjust, for example, an order in which they are displayed or to group digital credentials into, for example, a bin or folder. If there are additional digital credentials for the selected ID issuer that do not fit on the display screen, the user may select "View More Digital Credentials From Entity 1" to view the other digital credentials.

At the bottom portion of user interface 1300, a set of digital credentials corresponding to an identity attribute (in FIG. 13, "Attribute 1") are shown. This set includes Digital Credentials 1.1 and 1.2 from Trusted Entity 1 because they correspond to Attribute 1, as well as Digital Credential 2.4 (the fourth digital credential from entity 2) and Digital Credential 5.1 (the first digital credential from entity 5). The triangle adjacent to "Trusted Entity" indicates a drop-down menu that allows for selection of other ID issuers (if any)

through which digital credentials have been acquired. For Trusted Entity 1, four digital credentials are displayed, but more credentials (if any) may be displayed by selecting "View More Digital Credentials for Attribute 1" to view the other digital credentials.

Figure 14:
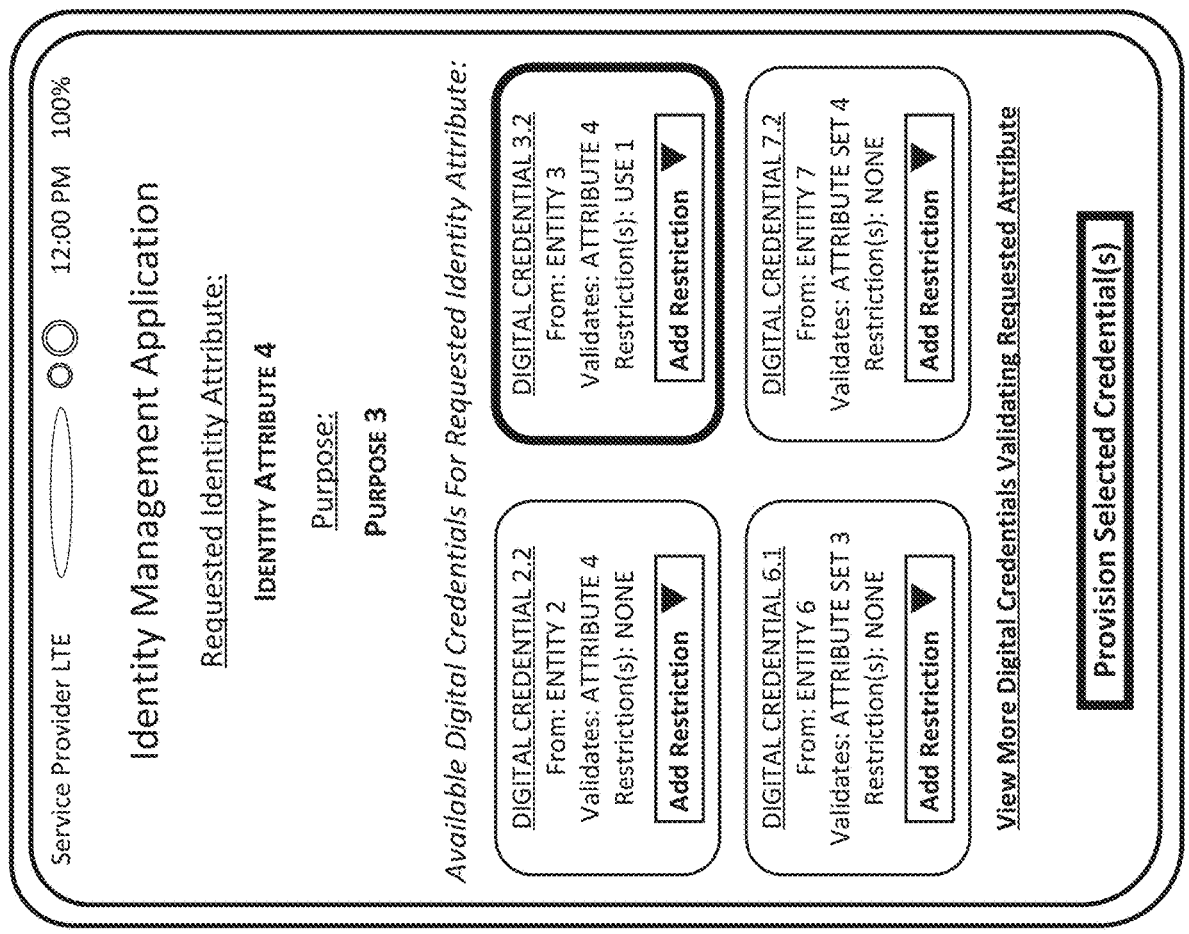
FIG. 14 depicts an example user interface for selection of digital credentials that may be provisioned for a requested identity attribute, according to example embodiments.

FIG. 14 shows a representation of an example user interface 1400 for ID management application 164 on user device 150, according to example embodiments. The user interface 1400 may be shown on a display screen of user device 150 after the user device 150 is provisioned, by a receiver device 170, a signal indicating what identity attributes are requested or required. The signal may be, or may comprise, for example, a wireless transmission and/or a QR code (or other code or symbols that may be scanned and analyzed) that was displayed on a display screen of the receiver device 170 and scanned by the user device 150. In FIG. 14, ID management application 164 indicates that Identity Attribute 4 has been requested for Purpose 3 (e.g., entry into a venue, healthcare delivery such as vaccination, dispensing of a prescription, or medical imaging, access to an account, database, or information source, access to a smart device and/or enabling of a function of the smart device, etc.). A set of digital credentials corresponding to the requested identity attribute are being shown. The set includes digital credentials from four different entities validating Attribute 4 (i.e., entities 2, 3, 6, and 7). Each digital credential identifies what is validated (e.g., an individual identity attribute or a set of identity attributes), and indicates whether any restrictions have been placed on usability of the digital credential. Each digital credential may also allow for imposition or application of restrictions via a selector. In user interface 1400, the selector is a drop-down menu (as indicated by the triangle adjacent to "add restriction"), and selection of a restriction from the drop-down menu adds the restriction to the digital credential. In some implementations, the selector may include the option to view and edit the restrictions of a digital credential (e.g., as an option to "Review/Modify Restrictions" under the drop-down menu). Selected digital credentials may be provisioned via the "provision selected credential(s)" icon at the bottom of user interface 1400.

Figure 15:
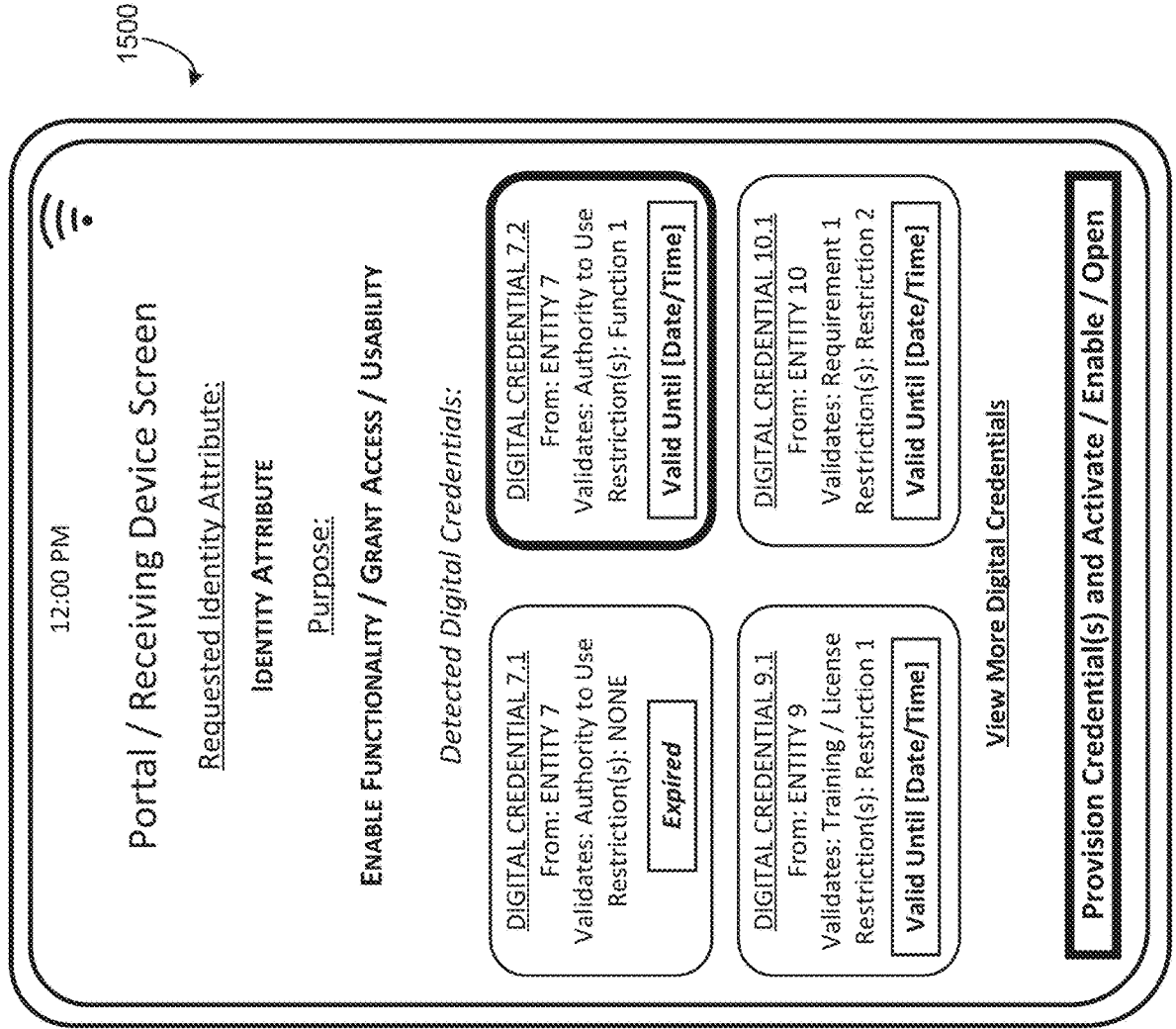
FIG. 15 depicts an example user interface for a receiving device that is associated with or part of a portal or smart device requesting one or more digital credentials to grant access, enable functionality, etc., according to example embodiments.

FIG. 15 shows a representation of an example user interface 1500 of a receiver device 170, according to example embodiments. The user interface 1500 may be targeted to a user of a user device 150 in potential implementations. The user interface 1500 may be presented via application layer 182, in various implementations. The user interface 1500 may be shown on a display screen of receiver device 170, for example, once the receiver device 170 detects a user (e.g., upon the user touching a touchscreen of the smart device or otherwise interacting with or engaging the smart device) and/or once the receiver device 170 detects a user device 150 (through, e.g., wireless communication with the user device 150 and/or through scanning of a code or other indicia displayed on a display screen of the user device 150). Additionally or alternatively, user interface 1500 may be an "always on" interface that is regularly displayed while the receiver device 170 is on. Receiver device 170 may, for example, display user interface 1500 as a welcome screen through which a user may gain access to or otherwise operate a smart device. User interface 1500 may indicate what identity attribute, such authorization from an owner or manager of the smart device, is requested by the receiver device 170 to grant access or enable functionality. User interface 1500 may also indicate why the identity attribute is being requested, such as for enabling a certain functionality (e.g., a smart vehicle enabling engine start, a smart home appliance enabling placement of an order for products, etc.), granting access to an area (e.g., a smart lock mechanism unlocking a user's home, office, warehouse, hotel room, etc.), or otherwise rendering the smart device usable (e.g., unlocking the device itself) with limited or unlimited functionality.

In some implementations, the receiver device 170 may detect (e.g., through secure wireless communication with the user device 150) which digital credentials that are available to the user device 150 (e.g., in ID wallet 166 and/or ID wallet 192) would be acceptable (or are otherwise relevant) for granting the user certain access or functionality. In user interface 1500, digital credentials 7.1 and 7.2 are from Entity 7, such as the owner of the smart device. Digital Credential 7.1 (which is indicated as being expired as a result of, e.g., an expiration date and/or a frequency restriction that limits the number of times the digital credential can be used) authorizes unrestricted use of the smart device, while Digital Credential 7.2 authorizes use of the smart device under certain restrictions. Example restrictions include limitations on which functions of the smart device are available (e.g., limited functionality as indicated by "Function Set 2" in user interface 1500, such as parental-type controls, corresponding with a subset of all functionalities of the smart device), time restrictions (e.g., only for an afternoon, morning, weekend, or month), presence of another user (e.g., upon detection of a user device of one or more specific other persons or receipt of one or more digital credentials from the user devices of the other persons, such as a parent or someone with certain position, rank, or status), limitations on where the smart device can be physically moved to (e.g., keeping the device in the house or not driving beyond a certain geographic area), frequency limitations (e.g., a maximum number of times the digital credential may be used to gain certain access) and/or limitations on which areas within a facility can be entered (e.g., entering an office building but not certain rooms or offices in the building).

Digital Credentials 9.1 and 10.1, from Entities 9 and 10, respectively, may be used to indicate another suitable certification or authorization that may be warranted, such as by a co-owner, governmental agency, certifying body, supervisor, parent, etc. For example, digital credentials may be used by a user to show that another entity has certified that a user has training or is licensed to operate a smart device, such as being licensed by the DMV to operate a vehicle, or being certified by a training organization to use scuba gear, etc. Alternatively or additionally, one or more additional digital credentials can be requested if a restriction requires, for example, that a device be used or a facility be entered only under the supervision of one or more specific persons. In various embodiments, an entity (e.g., an owner of a device) may only allow access or use for a limited time, allowing, for example, the owner to limit or revoke authorization as desired. Selected digital credentials may be provisioned by user device 150 following selection of a "provision credential(s)" icon at the bottom of user interface 1500. In some embodiments, the "provision credentials" icon is not activated unless an acceptable combination of digital credentials has been selected by a user.

In various embodiments, the digital credentials identified in user interface 1500 may be digital credentials of more than one user (e.g., detected from two nearby user devices 150). Digital credentials of multiple users may be requested or required if, for example, the presence or authorization of another user (e.g., an adult) is required to enable functionality (e.g., if a user is a minor without a license or valid credit card for a purchase to be made via the receiver device 170).

In certain embodiments, the digital credential is from another device that detects a certain condition or status and certifies that the condition is satisfied or status is satisfactory. For example, a digital credential may be based on a nearby sobriety or other health detection device that accepts physiological signals from the user for use in validating the user is in a condition suited to using the smart device. In some embodiments, the other device (e.g., physiological signal detecting device) may require a digital credential from the user device 150 to demonstrate an identity attribute before the physiological signals are detected. The digital credential may, in some implementations, be provided to receiver device 170 by the user device 150 along with a status or an indication as to whether a condition has been met as confirmed via the other device.

In various embodiments, the receiver device 170 may indicate which identity attribute(s) are requested to grant access or enable functionality through direct transmission to the user device 150. In some implementations, the user device 150 may provision suitable digital credentials automatically. In certain implementations, the user device 150 may allow the user to select particular digital credentials to be provisioned, and/or confirm that digital credentials should be provisioned (via, e.g., a user interface analogous to user interface 1300 of FIG. 13). For example, the user interface of the user device 150 may present suitable digital credentials in the user's ID wallet, such as the example digital credentials depicted in user interface 1500.

In various embodiments, user device 150 may provision, and/or receiver device 170 may receive, digital credentials without involvement of display screens. For example, a user device 150 may receive a request for a digital credential through wireless transmission and indicate receipt of a request through other, for example, haptics, sounds, lights, or other outputs. Additionally, the user device 150 may accept instructions to provision a digital credential to a receiver device 170 through gestures, voice command, movements that generate signals through smart clothing, or other inputs. Visual prompts and graphical user interfaces thus need not be implemented. In various embodiments, user device 150 and/or receiver device 170 may lack display screens. For example, a user device 150 used to provide digital credentials may be a dedicated digital credential provisioning device that may lack a screen, or that may not use a display screen for, for example, identification or selection of digital credentials or confirmation that one or more digital credentials are to be provisioned. Alternatively or additionally, a receiver device 170 used to accept digital credentials may be a dedicated digital credential validating device that may lack a screen, or that may not use a display screen for, for example, identification or selection of digital credentials or confirmation that one or more digital credentials are to be requested. In various embodiments, devices (e.g., user devices 150, receiver devices 170, and/or smart devices that provide certain access or functionality based on digital credentials received directly from user devices 150 or received via receiver devices 170) may interface through a network of devices (e.g., an IoT network) to identify, exchange, and/or validate digital credentials.

The user interfaces discussed herein and illustrated in the drawings are only intended as non-limiting examples, and fewer or more user interfaces, with fewer or more functionalities and selections, may be provided in various versions. The functionalities, selectors, information, etc. represented in the user interfaces depicted in the figures can be combined and/or rearranged in various ways (to, e.g., "mix and match" functionalities and/or selections), yielding additional, fewer, and/or different interfaces, each with additional, fewer, or different functionalities and selections.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented via a mobile device running a mobile application having access to a first digital credential and a second digital credential, the method comprising:
    receiving, by the mobile device from a receiver device, a first signal indicative of a request to prove an identity attribute;
    displaying, by the mobile device, via one or more user interfaces of the mobile computing device, a graphical user interface (GUI) comprising a plurality of selectable digital credentials, wherein the GUI presents a first digital credential and a second digital credential, wherein both the first digital credential and the second digital credential attest to the identity attribute to be proven to the receiver device, the first digital credential having been validated by a first trusted entity and the second digital credential having been validated by a second trusted entity distinct from the first trusted entity;
    receiving, by the mobile device, via the one or more user interfaces of the mobile computing device, a second signal indicating selection of at least one of the plurality of selectable digital credentials in the GUI; and
    provisioning, by the mobile device to the receiver device, the at least one of the plurality of selectable digital credentials based on the second signal.

2. The method of claim 1, wherein the provisioned digital credential is the first digital credential, the method further comprising provisioning, by the mobile device to the receiver device, the second digital credential.

3. The method of claim 1, wherein the GUI is configured to allow a user to select from among multiple digital certificates of multiple trusted entities for proving multiple identity attributes to the receiver device.

4. The method of claim 1, wherein the first signal is a code displayed on a display screen of the receiver device, and wherein receiving the first signal comprises scanning the displayed code using an imager of the mobile device.

5. The method of claim 4, wherein the code is a QR code displayed by the receiver device, and wherein determining that the QR code includes the request for the identity attribute comprises deciphering the QR code.

6. The method of claim 1, wherein the first signal is a wireless communication transmitted by the receiver device directly to the mobile device.

7. The method of claim 1, wherein provisioning the at least one of the plurality of selectable digital credentials comprises generating a code with the at least one of the plurality of selectable digital credentials, and wherein the method further comprises displaying the code via the one or more user interfaces of the mobile device.

8. The method of claim 1, wherein provisioning the at least one of the plurality of selectable digital credentials comprises generating a message with the first credential, and wirelessly transmitting the message to the receiver device.

9. The method of claim 8, wherein wirelessly transmitting the message comprises directly transmitting the message to the receiver device via near-field communication.

10. The method of claim 1, wherein the identity attribute is an extrapolation from data elements of a user.

11. The method of claim 10, wherein the extrapolation is a determination, based on a birthdate of the user, as to whether the user has reached a minimum age, and wherein the one or more provisioned digital credential attest to the user having reached the minimum age.

12. The method of claim 11, further comprising displaying, by the mobile device, an image of the user, an icon indicating that the user is at least the minimum age, and an identification of one or more trusted entities corresponding to the one or more provisioned digital credentials.

13. A method implemented via a mobile device with access to a plurality of digital credentials, the method comprising:
    presenting, by the mobile device, a first graphical user interface (GUI) via one or more user interfaces of the mobile device, the first GUI comprising selectable identity attributes;
    detecting, by the mobile device, one or more selections of one or more of the identity attributes;
    presenting, by the mobile device, a second GUI via the one or more user interfaces, the second GUI comprising selectable digital credentials identified for proving validation of the selected identity attributes;
    detecting, by the mobile device, one or more selections of one or more of the digital credentials; and
    provisioning, by the mobile device to a receiver device, the one or more selected digital credentials.

14. The method of claim 13, wherein the second GUI comprises a first digital credential corresponding to validation of an identity attribute by a first trusted entity, and a second digital credential corresponding to validation of the same identity attribute by a second trusted entity.

15. The method of claim 13, further comprising generating a QR code with the digital credentials selected via the second GUI, wherein provisioning the one or more credentials to the receiver device comprises displaying the QR code for scanning by the receiver device.

16. The method of claim 13, wherein provisioning the one or more credentials to the receiver device comprises displaying one or more codes via the one or more user interfaces of the mobile device, the one or more codes comprising the one or more credentials attesting to the selected identity attributes.

17. The method of claim 13, wherein provisioning the one or more credentials to the receiver device comprises wirelessly transmitting, to the receiver device by the mobile device, the one or more credentials attesting to the selected identity attributes.

18. A mobile device with access to multiple digital credentials validated by multiple trusted entities, the mobile device comprising:
    a wireless communications interface;
    an imager configured to detect ambient imagery;
    one or more user interfaces configured for visually presenting graphical elements and receiving user inputs, the one or more user interfaces comprising a display device; and
    a processor configured to:
        receive, via at least one of the wireless communications interface or the imager, a request for one or more identity attributes;

identify a plurality of digital credentials that attest to the one or more identity attributes, the plurality of digital credentials having been validated by multiple trusted entities;

display, via the one or more user interfaces, a graphical user interface (GUI) comprising the plurality of digital credentials that attest to the identity attributes, wherein one or more of the plurality of digital credentials are selectable via the one or more user interfaces;

receive, via the one or more user interfaces, a selection of one or more of the plurality of digital credentials presented by the GUI; and provision to the receiver device, via at least one of the wireless communications interface or the one or more user interfaces, the selected one or more digital credentials attesting to the one or more identity attributes corresponding to the request.

19. The device of claim 18, wherein receiving the request comprises detecting, using the imager, a code identifying the one or more identity attributes being requested.

20. The device of claim 18, wherein provisioning the selected one or more digital credentials comprises displaying at least one of:

one or more of the requested identity attributes; or one or more machine-readable codes which, when scanned and analyzed by the receiver device, reveal one or more of the requested identity attributes.

* * * * *